(12) United States Patent
Ausserlechner et al.

(10) Patent No.: US 9,354,084 B2
(45) Date of Patent: May 31, 2016

(54) OFF-AXIS MAGNETIC FIELD ANGLE SENSORS

(71) Applicant: INFINEON TECHNOLOGIES AG, Neubiberg (DE)

(72) Inventors: Udo Ausserlechner, Villach (AT); Mario Motz, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 276 days.

(21) Appl. No.: 14/083,643

(22) Filed: Nov. 19, 2013

(65) Prior Publication Data

US 2015/0137797 A1 May 21, 2015

(51) Int. Cl.
*G01B 7/30* (2006.01)
*G01R 33/07* (2006.01)
*G01R 33/09* (2006.01)
*G01D 5/14* (2006.01)
*G01D 3/08* (2006.01)

(52) U.S. Cl.
CPC . *G01D 5/145* (2013.01); *G01D 3/08* (2013.01)

(58) Field of Classification Search
CPC ........................................................ G01B 7/30
USPC .................................................... 324/207.25
See application file for complete search history.

(56) References Cited

U.S. PATENT DOCUMENTS

| 2011/0068780 | A1* | 3/2011 | Sakai ........................ 324/207.25 |
| 2011/0215797 | A1* | 9/2011 | Steinich et al. .......... 324/207.25 |
| 2013/0264915 | A1* | 10/2013 | Suzuki et al. ............... 310/68 B |

FOREIGN PATENT DOCUMENTS

WO     WO 2012090768 A1 *  7/2012

* cited by examiner

*Primary Examiner* — Bot Ledynh
(74) *Attorney, Agent, or Firm* — Schiff Hardin LLP

(57) ABSTRACT

Embodiments relate to magnetic field angle sensing systems and methods. In an embodiment, a magnetic field angle sensing system configured to determine a rotational position of a magnetic field source around an axis, comprises N sensor devices arranged in a circle concentric to an axis, wherein N>1 and the sensor devices are spaced apart from one another by about (360/N) degrees along the circle, each sensor device comprising a magnetic field sensing device having a sensitivity plane comprising at least one reference direction of the magnetic field sensing device, wherein the magnetic field sensing device is sensitive to a magnetic field component in the sensitivity plane and configured to provide a signal related to a (co)sine of an angle between the reference direction and the magnetic field in the sensitivity plane; and circuitry coupled to the N sensor devices and configured to provide a signal indicative of a rotational position of a magnetic field source around the axis determined by combining the signals from the magnetic field sensing devices of the N sensor devices.

16 Claims, 15 Drawing Sheets

OFF-AXIS MAGNETIC FIELD ANGLE SENSORS

TECHNICAL FIELD

The invention relates generally to magnetic field sensors and more particularly to off-axis magnetic field angle sensors.

BACKGROUND

Magnetic field sensors can be used to sense an angle of rotation of a shaft or other object. For example, a magnet can be mounted on the shaft such that it rotates with the shaft, and a magnetic field sensor can be arranged proximate the magnet in order to sense a magnetic field induced by the magnet as it rotates with the shaft. When the magnetic field sensor is mounted next to or adjacent the shaft, i.e., off of the axis of rotation of the shaft, the sensor can be referred to as an "off-axis" magnetic field angle sensor. Off-axis magnetic field angle sensors often are implemented when the end of the shaft is unavailable as a location for the sensor or there simply is not space available on the shaft.

In many applications there can be a general preference for magnetic field angle sensors, including off-axis magnetic field angle sensors, to be inexpensive and non-complex while also being robust with respect to external magnetic fields and other disturbances, able to account for assembly tolerances, and compatible with a range of magnets, including large magnets which are inhomogeneously magnetized. A drawback of some conventional approaches, then, is a requirement of at least two sensor substrates with sensor elements having the same magnetic sensitivity. The required matched magnetic sensitivity is difficult to obtain and in combination with the need for multiple sensor substrates is more expensive to produce.

SUMMARY

Embodiments relate to magnetic field angle sensing systems and methods. In an embodiment, magnetic field angle sensing system configured to determine a rotational position of a magnetic field source around a rotation axis, comprises N sensor devices arranged in a circle concentric to the rotation axis, wherein N>1 and the sensor devices are spaced apart from one another by about (360/N) degrees along the circle, each sensor device comprising a magnetic field sensing device having a sensitivity plane comprising at least one reference direction of the magnetic field sensing device, wherein the magnetic field sensing device is sensitive to a magnetic field component in the sensitivity plane and configured to provide a signal related to a (co)sine of an angle between the reference direction and the magnetic field in the sensitivity plane; and circuitry coupled to the N sensor devices and configured to provide a signal indicative of a rotational position of a magnetic field source around the rotation axis determined by combining the signals from the magnetic field sensing devices of the N sensor devices.

In another embodiment, a method of determining a rotational position of a magnetic field source around a rotation axis, comprises arranging N>1 sensor devices in a circle concentric to the rotation axis such that the sensor devices are spaced apart from one another by about (360/N) degrees along the circle; sensing, by a magnetic field sensing device of each of the N>1 sensor devices, a (co)sine of an angle between a reference direction of the magnetic field sensing device and the magnetic field in a sensitivity plane of the magnetic field sensing device induced by the magnetic field source, the sensitivity plane comprising at least one reference direction of the magnetic field sensing device; providing a signal related to the (co)sine of the angle between the reference direction and the magnetic field in the sensitivity plane; and providing a signal indicative of a rotational position of the magnetic field source around the rotation axis by combining the signals from the magnetic field sensing devices of the N>1 sensor devices.

BRIEF DESCRIPTION OF THE DRAWINGS

The invention may be more completely understood in consideration of the following detailed description of various embodiments of the invention in connection with the accompanying drawings, in which.

Figure 1:
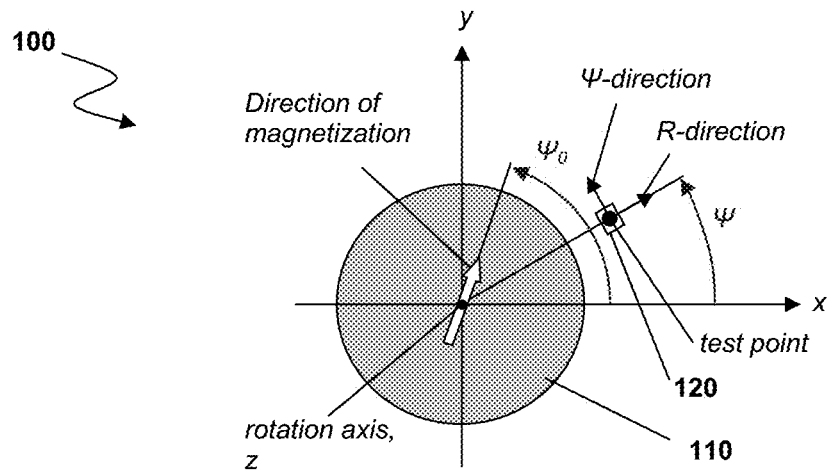
FIG. 1 is a plan view of part of a sensor system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to magnetic field angle sensors, systems and methods. In embodiments, a magnetic field angle sensor comprises a magnet rotatable about a rotation axis and at least one magnetic field sensor element arranged off of (e.g., not in line with) but proximate to the rotation axis. In embodiments, the at least one magnetic field sensor element can comprise a magnetoresistive (XMR) sensor element, a Hall-effect sensor element, or some other magnetic field sensor element.

Referring to FIG. 1, an embodiment of a magnetic field angle sensing system 100 is depicted in a plan view. System 100 comprises a magnetic field source, such as a magnet 110, and at least one sensor device 120. In embodiments, system 100 comprises N>1 sensor devices, such as N≥3, or N≥5, in various embodiments as discussed in more detail herein below. Although in the embodiment of FIG. 1 the at least one sensor device 120 is arranged at a radial distance larger than the radius of magnet 110, in other embodiments sensor device(s) 120 can be arranged closer to the rotation axis than the radius of magnet 110.

Magnet 110 is rotatable about a rotation axis z, which extends into and out of the page as depicted in FIG. 1. In embodiments, magnet 110 is rotationally symmetrical about the z-axis, such as in the embodiment depicted. Magnet 110 can be generally cylindrical, though magnet 110 can comprise a disk, a torus, a truncated cone, a sphere, a rotational ellipsoid or some other rotationally symmetric shape in other embodiments. In still further embodiments, magnet 110 can be non-rotationally symmetric and comprise, e.g., a block or other shape, though such embodiments may have reduced accuracy with respect to other embodiments, which may nevertheless be acceptable in some situations or applications. In embodiments, magnet 110 is mounted or otherwise affixed to a shaft (not shown in FIG. 1) such that it rotates therewith, which can be ferrous or non-ferrous in embodiments such that its permeability, μr, can range from about 1 to about 100,000.

Magnet 110 is diametrically magnetized in embodiments, such as in the $\Psi_0$ direction indicated in FIG. 1, which rotates with magnet 110. Thus, the magnetic field induced by magnet 110 so magnetized in one embodiment can be described by:

$$B_R = \hat{B}_R \cos(\psi - \psi_0)$$

and $$B_\psi = \hat{B}_\psi \sin(\psi - \psi_0)$$

in which the amplitudes $\hat{B}_R$ and $\hat{B}_\psi$ can have different values and/or different signs, depending upon the radial position R and axial position z of the test point, which is the position of sensor device 120 as illustrated in FIG. 1. The azimuthal coordinate of the test point is $\psi$.

More generally, magnet 110 can have a magnetization according to:

$$\vec{M} = M_s \cos(p\psi)\vec{n}_R - M_s \sin(p\psi)\vec{n}_\psi = M_s \cos((p-1)\psi)\vec{n}_x - M_s \sin((p-1)\psi)\vec{n}_y$$

whereby $M_s$ is the magnitude of the magnetization vector and p is the integer number of pole pairs and can be negative. For p=1, this provides a diametrical magnetization in the x-direction. This type of magnetization can be referred to as Halbach magnetization, which can produce a magnetic field with sinusoidal variation versus azimuthal coordinate. If the period is smaller than 360°, these magnets can still be used for angle sensors with smaller angular ranges. For example, for p=2, the period is 180° and such a magnet can be used for an angle sensor with a full range less than or equal to 180°.

At least one sensor device 120 can comprise one or more magnetoresistive (MR) sensor elements, Hall-effect sensor elements, or some other suitable magnetic field sensor elements in embodiments. In embodiments, sensor device 120 comprises at least one strong-field MR sensor element and can comprise an anisotropic magnetoresistor (AMR), giant magnetoresistor (GMR), tunneling magnetoresistor (TMR) and/or colossal magnetoresistor (CMR) in various embodiments. In general, MRs are thin structures having two lateral dimensions that define a sensitivity plane and are much larger than the third (thickness or depth) dimension. MRs respond to the projection or component of the magnetic field in this sensitivity plane, the in-plane field. A "strong-field" MR is one for which the resistance is a function of the cosine of the magnetic angle (i.e., the angle between the in-plane magnetic field and a reference direction parallel to the sensitivity plane) and is independent of the magnitude of the in-plane magnetic field (i.e., the projection of the magnetic field vector onto the sensitivity plane, which can be obtained by subtracting the magnetic field component perpendicular to the sensitivity plane from the magnetic field vector), at least in wide ranges such as about 10 mT to about 200 mT. In contrast, weak-field MRs are MRs in which the resistance changes significantly if the direction of the applied magnetic field is constant and only the magnitude changes.

For AMRs, the reference direction is the same as the direction of current flow through the magnetoresistor. Thus, an AMR with a reference direction $\vec{n}_\eta$ defined by Barber poles is modeled by:

$$R_{AMR\eta} = R_0(1 + h[\cos \angle(\hat{B}_R \vec{n}_R + \hat{B}_\psi \vec{n}_\psi, \vec{n}_\eta)]^2)$$

where h is small, such as about 0.03 in an embodiment, and wherein $\angle(\vec{a}, \vec{b})$ denotes the angel between vectors $\vec{a}$ and $\vec{b}$. $\hat{B}_R \vec{n}_R + \hat{B}_\psi \vec{n}_\psi$ is the in-plane magnetic field. The sensitivity plane is parallel to all three vectors $\vec{n}_R, \vec{n}_\psi, \vec{n}_\eta$. For GMRs, TMRs and CMRs, for example, the reference direction is defined by the direction of the magnetization in the hard magnetic reference layer, which is also referred to as the pinned layer or pre-magnetization. GMRs and TMRs with reference direction $\vec{n}_\eta$ can be modelled by $$R_{MR\eta} = R_0(1 + h \cos \angle(\hat{B}_R \vec{n}_R + \hat{B}_\psi \vec{n}_\psi, \vec{n}_\eta))$$

For GMRs, h typically is a smaller number, such as about 0.05; for TMRs, h is larger, such as about 0.5 in one embodiment.

Figure 2A:
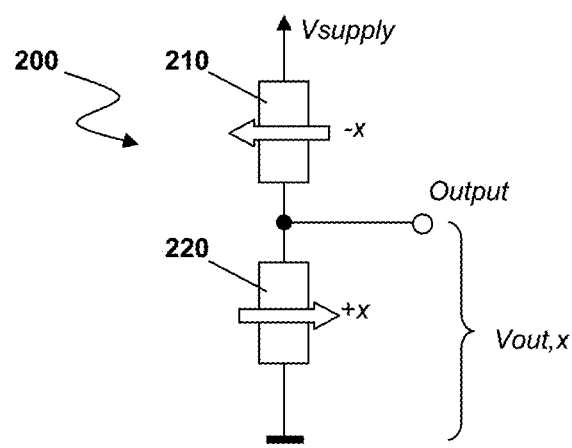
FIG. 2A is a diagram of a half-bridge circuit according to an embodiment.

Referring also to FIG. 2A, in embodiments at least one sensor device 120 comprises a half-bridge circuit 200. Half-bridge circuit 200 comprises two MR elements 210 and 220 each having a pinned layer and coupled in series between a supply voltage Vsupply and a reference voltage, such as ground, thereby forming a voltage divider circuit. MR elements 210 and 220 have anti-parallel reference directions, −x and +x, as illustrated in FIG. 2A. Herein throughout, if reference is made to a sensor device, such as MR elements 210 and 220, the sensitivity direction is described with respect to the local reference frame (x, y, z). A different global Cartesian reference frame (x, y, z) or an equivalent global circular cylindrical reference frame (e.g., R, psi, z) may be used to define the locations of the test points and the magnetic field components acting on the magnetic field sensing devices (e.g., MR elements 210 and 220).

Figure 2B:
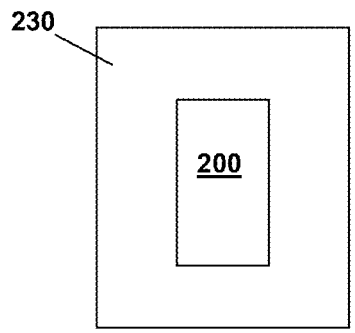
FIG. 2B is a block diagram of a die arrangement according to an embodiment.

In one embodiment, MR elements 210 and 220 are identical or nearly so, being closely matched in electric and magnetic parameters with the exception of their reference directions. One way to achieve this is for elements 210 and 220 to be manufactured together, e.g., simultaneously, according to the same manufacturing processes and sequences. Thus, in embodiments and referring also to FIG. 2B, half-bridge circuit 200 is arranged on a single die 230 following singulation of the larger substrate (e.g., silicon or glass wafer or other structure). In some embodiments, one or more additional half-bridge circuits and/or other elements, such as pre-amplifiers, interface circuits or other circuitry, can also be arranged on die 230.

In operation, supply voltage Vsupply is applied across the series-coupled elements 210 and 220, and a potential at the common node between elements 210 and 220 is tapped as the output voltage Voutx:

$$V_{outx} = V_{supply} \frac{1 + h\cos <(\vec{B}_{in-plane}, \vec{n}_x)}{2}$$

Figure 2C:
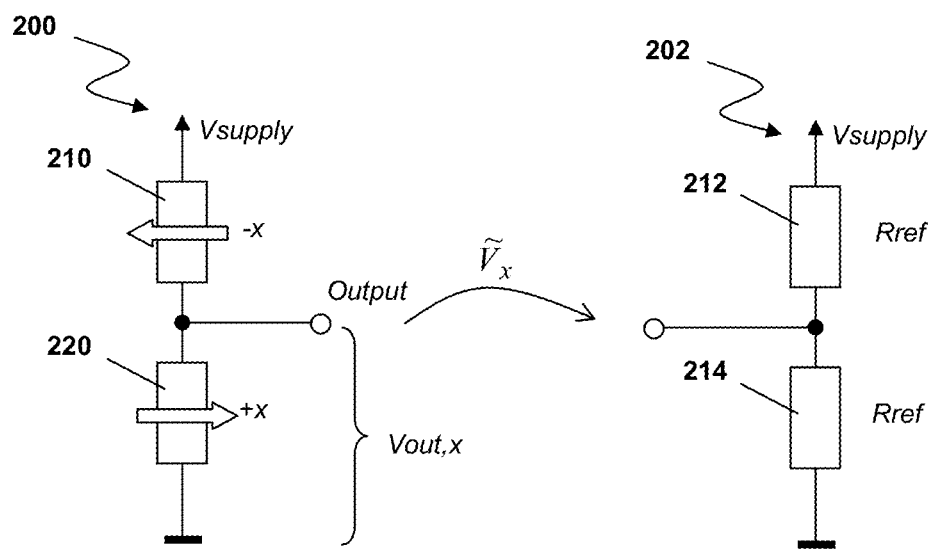
FIG. 2C is a diagram of a half-bridge circuit configuration according to an embodiment.

Then, and referring also to FIG. 2C comprising a half-bridge 200 and a voltage divider 202 it is further possible to subtract Vsupply/2 from Voutx:

$$\tilde{V}_x = V_{outx} - \frac{V_{supply}}{2} = \frac{V_{supply}}{2} h\cos <(\vec{B}_{in-plane}, \vec{n}_x)$$

The normalized signal can also be used:

$$\tilde{S}_x = \tilde{V}_x/(hV_{supply}) = 0.5 \times \cos \angle (\vec{B}_{in-plane}, \vec{n}_x)$$

In embodiments, if a sensor system comprises several half-bridge circuits, only a single voltage divider (e.g., 202) is needed and need not be located at any particular test point. The normalized signal $\tilde{S}_x$ is apt to uniquely or unambiguously determine the cosine of the magnetic field angle, whereby the magnetic angle was defined above as the angle between the in-plane magnetic field $\vec{B}_{in-plane}$ and the reference direction $\vec{n}_x$. The normalized signal $\tilde{S}_x$, however, is not apt to uniquely or unambiguously determine the magnetic angle because the inverse function of the cosine is not a unique function over a full revolution of 360 degrees. In the following it will be shown how to combine the signals $\tilde{S}_x$ sampled at several test points around the rotation axis in order to reconstruct the angular position of the magnet, even though this angle generally cannot be deduced from the signal $\tilde{S}_x$ at any single test point alone.

Figure 2D:
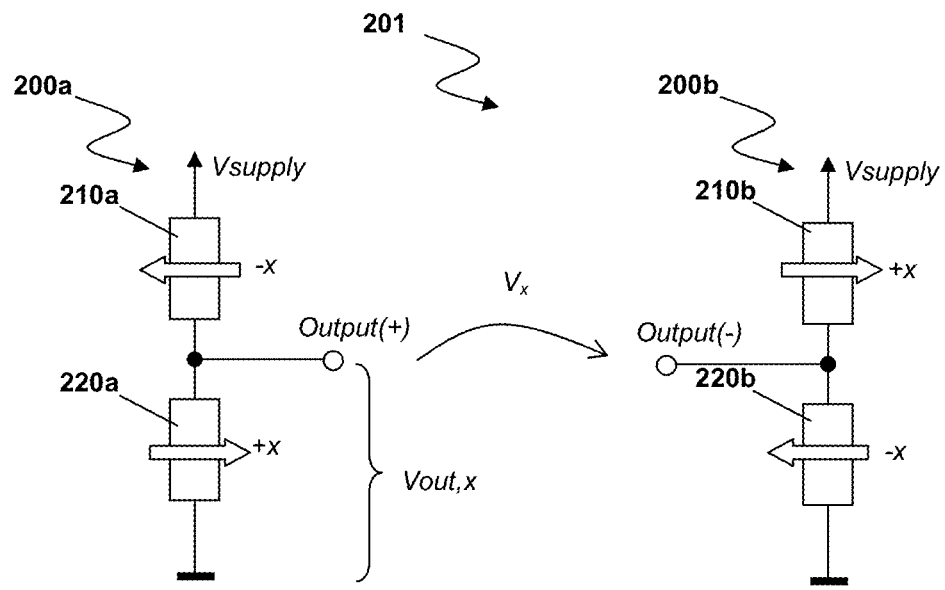
FIG. 2D is a diagram of a full-bridge circuit according to an embodiment.

Then, and referring to FIG. 2D, two half-bridges 200a and 200b can be combined to form a full bridge circuit 201, for which Vx can be determined according to:

$$V_x = \tilde{V}_x - (-\tilde{V}_x) = V_{supply} h \cos \angle (\vec{B}_{in-plane}, \vec{n}_x)$$

Again, the normalized signal may also be used:

$$S_x = V_x/(hV_{supply}) = \cos \angle (\vec{B}_{in-plane}, \vec{n}_x)$$

Full-bridge circuit 201 can double the output voltage versus a single half-bridge but also requires generally twice the space and can require additional wiring or connections in order to be read out, given that full-bridge 201 has two outputs, Output (+) and Output(−), compared with the single Output for half-bridge circuit 200 in, e.g, FIG. 2A. Half-bridges 200a and 200b of full-bridge circuit 201 are arranged at the same test point in embodiments. Half-bridge circuits may generally be discussed herein, with the knowledge that they may be replaced or substituted by full-bridges as appreciated by those skilled in the art.

Figure 4A:
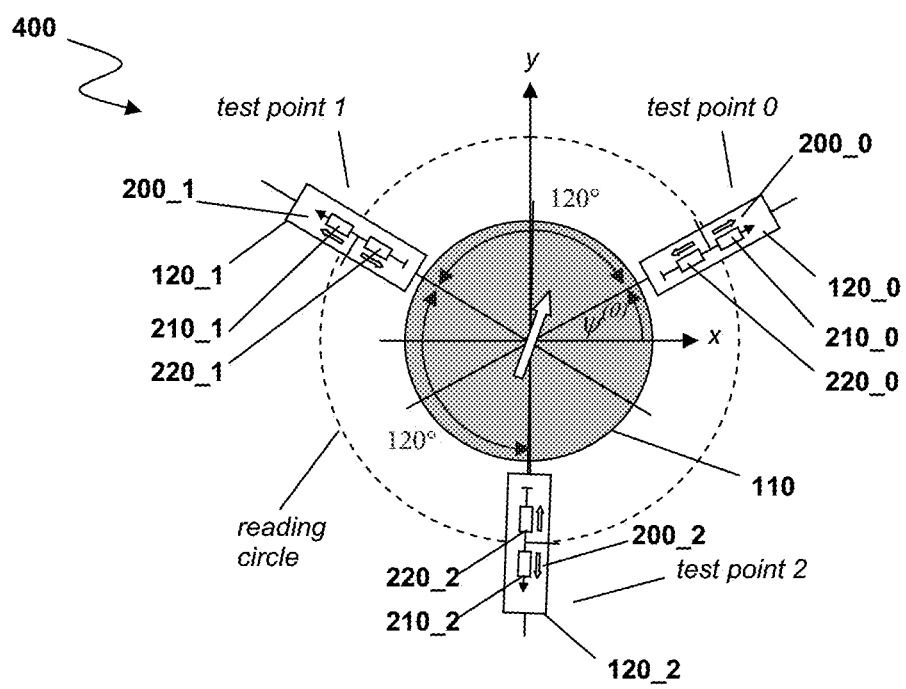
FIG. 4A is a schematic plan view of a sensor system according to an embodiment.

Returning to FIG. 1, one sensor device 120 at a single test point (e.g., relative arrangement of sensor device 120 and magnet 110 about axis z) is depicted, though in embodiments a plurality of sensor devices 120 at a plurality of test points are used. For example, and now also referring to sensor system 400 of FIG. 4A, in one embodiment at least three test points 0, 1 and 2 are used, such that at least three sensor devices 120 are implemented. The former arrangement, in which a sensor element 120 is arranged at each test point (e.g., N is a number of test points and is ≥3, and the sensor system comprises N=3 sensor elements 120) generally will be discussed herein as depicted in FIG. 4A, though other arrangements can be used in other embodiments.

In embodiments, it also is assumed that the magnetic field at MR elements 210 and 220 of each sensor device 120 is essentially homogeneous, given their small size and considering that elements 210 and 220 are much smaller than magnet 110. For example, in one embodiment elements 210 and 220 are around 0.05 mm$^2$, whereas magnet 110 (viewed in the direction of rotation axis z) is at least about 500 times larger (the depiction in FIG. 4A and elsewhere not necessarily to scale for illustrative purposes). In other words, the spacing between sensor devices 120 is significantly larger than the spacing between elements 210, 220 of the same half-bridge so that both elements 210, 220 of a half-bridge experience generally the same magnetic field while elements of different devices 120 experience different fields. Though the small spacing between elements 210, 220 of a single half-bridge can lead to those elements experiencing slightly different fields, any resultant angle errors can be addressed.

The plurality of sensor elements 120 are spaced apart equally and/or uniformly about the z-axis in an embodiment, e.g., at 360°/N, and the radial distance of each test point (e.g., the distance between the rotation axis z and the test point) is approximately equal. Thus, in an embodiment comprising three sensor elements 120_0, 120_1 and 120_2, a sensor element is arranged approximately every 120° about the z-axis, on a reading circle that is concentric to the rotation axis. Such a configuration is depicted in FIG. 4A. In embodiments, a diameter of the reading circle is sized such that the rotation axis does not cross any die of sensor elements 120_0, 120_1 and 120_2; in other words, a diameter of the reading circle on which the test points are arranged is larger than a diameter of magnet 110. In other embodiments, the test points may be within the outer diameter of magnet 110 though still arranged at a sufficient radial distance that the shaft at the rotation axis and to which magnet 110 is mounted is not obstructed. In other words, sensor elements 120_0, 120_1 and 120_2 generally remain off-axis sensor elements as opposed to on-axis sensor elements.

Furthermore, in embodiments the test points 0, 1 and 2 are arranged in a plane that is perpendicular to the rotation axis z. The plane is an (R,Ψ)-plane, with a circular cylindrical reference frame, or an (x,y)-plane, with a Cartesian coordinate system.

Additionally, in embodiments sensor system 400 computes finite sums, such as:

$$\sigma_{a,n} = \sum_{m=0}^{N-1} \tilde{S}_a(\psi^{(m)}) \exp(2\pi jmn/N)$$

where $\tilde{S}_a(\psi^{(m)})$ are signals sampled at equidistant azimuthal angles $\psi^{(m)} = 2\pi m/N$ and the index a denotes the reference direction $\vec{a}$ of the MRs. Generally speaking, this is a linear combination with complex-valued weighing factors exp ($2\pi jmn/N$), wherein j is the imaginary portion. It can also be viewed as a complex valued discrete Fourier transform of the N sampled data $\tilde{S}_a(\psi^{(m)})$. Instead of a single complex-valued sum, a set of two real-valued sums can be used:

$$\text{Re}\{\sigma_{a,n}\} = \sum_{m=0}^{N-1} \tilde{S}_a(\psi^{(m)}) \cos(2\pi jmn/N) \text{ and } \text{Im}\{\sigma_{a,n}\} = \sum_{m=0}^{N-1} \tilde{S}_a(\psi^{(m)}) \sin(2\pi jmn/N)$$

In embodiments in which large numbers of test points are used, this converges to the integral $$(N/(2\pi)) \int_{\psi=0}^{2\pi} \tilde{S}_a(\psi) \exp(jn\psi) \, d\psi,$$

which can be computed numerically by one of many quadrature schemes (e.g., Simpson's rule or Gauss quadrature, among others). For example, one may choose a quadrature scheme with non-equidistant sample points, such that in embodiments the test points in system 400 need not be equidistant (though they will or may be in some embodiments, as regularly-spaced test points can improve the accuracy of the system, including with respect to necessary computational or other effort). Additionally, the function arctan $2\{x, y\}$ can be used, defined generally as:

$$\arctan2\{x, y\} = \begin{cases} \arctan(y/x) & \text{for } x > 0 \\ \arctan(y/x) + \pi & \text{for } x < 0 \\ \pi/2 & \text{for } x = 0 \text{ and } y > 0 \\ -\pi/2 & \text{for } x = 0 \text{ and } y < 0 \end{cases}$$

whereby integer multiples of $2\pi$ are added until the result is in the interval [0 rad, $2\pi$ rad) or [0°, 360°). It is equivalent to the angle between $\vec{n}_x$ and $x\vec{n}_x + y\vec{n}_y$.

Thus, in system 400, each test point 0, 1 and 2 comprises a half-bridge 200_0, 200_1 and 200_2 with a reference direction $\vec{a}$ parallel to the (R,Ψ)-plane. In embodiments, the reference direction can be the same as $\vec{n}_R$ or $\vec{n}_\psi$. The N=3 test points are arranged at azimuthal positions $\psi^{(m)} = \psi^{(0)}, \psi^{(0)} + 360°/N, \psi^{(0)} + 2 \times 360°/N, \ldots$, as depicted. In operation, system 400 samples the signals $\tilde{S}_a(\psi^{(m)})$ for m=0, 1, ..., N-1 derived from half-bridges 200_0, 200_1 and 200_2 with reference directions $\vec{a}$.

Figure 3A:
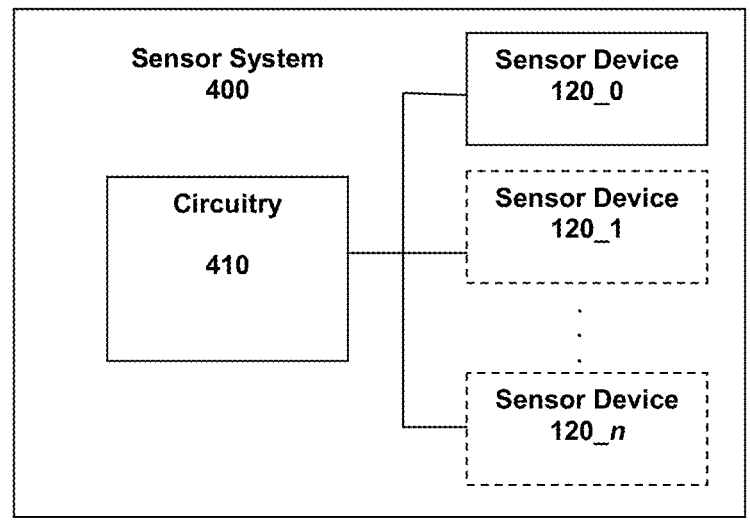
FIG. 3A is a block diagram of a sensor system according to an embodiment.

In embodiments, the sample, determinations and computations discussed herein can be carried out by control or other circuitry forming part of or otherwise coupled to half-bridges 200_0, 200_1 and 200_2. One embodiment is depicted in FIG. 3A, in which circuitry 410 is part of system 400 and is coupled to at least one sensor device 120_0, 120_1 and 120_n, though in embodiments more or fewer sensor devices and/or half-bridges or other sensor circuits may be implemented in system 400. Circuitry 410 can comprise control, evaluation, signal conditioning and/or other circuitry and be dedicated sensor system circuitry, or it can comprise part of another system or component (e.g., an electronic control unit, ECU, in automotive or other applications). System 400 can be arranged on or in multiple dies or packages, and the various components (not all of which are depicted in the simplified block diagram of FIG. 3A) can be electrically, communicatively and/or operatively coupled with another as suitable or appropriate for any given application or implementation, as those skilled in the art will appreciate that these arrangements will vary.

In embodiments, circuitry 410 can sample N signals, simultaneously in an embodiment. Thus, circuitry 410 can comprise N input channels with sample-and-hold circuitry. Once the N signals are sampled, circuitry 410 can process them immediately or hold them for processing until, e.g., the next clock cycle, when N signals are again sampled. If system resources are limited, it is also possible to sample the N signals consecutively, such as with the sequence of sampling be clockwise, counter-clockwise or according to some other non-arbitrary scheme in embodiments, for example in the direction of rotation of the magnet in one embodiment.

Following the aforementioned sampling, circuitry 410 can compute the following, which is a sum of complex numbers but may also be viewed as a short-hand of two sums over real-valued numbers:

$$\sigma_{a,n} = \sum_{m=0}^{N-1} \tilde{S}_a(\psi^{(m)}) \exp(2\pi jmn/N)$$

for n=0, 1, ..., N-1 with the imaginary unit $j=\sqrt{-1}$. The fundamental frequency of this discrete Fourier transform, $\sigma_{a,1}$ (n=1), represents the dominant part of the field of magnet 110, whereas the mean (n=0) and the higher harmonics (n>1) are caused by non-idealities, such as background magnetic disturbances, eccentric mounting of magnet 110 or sensors 200 versus rotation axis, sensor errors, magnet errors (e.g., deviation from spatial sinusoidal fields) and others. Thus, sensor system 400 generally computes only the fundamental frequency, whereby the ratio of real and imaginary parts thereof provides the tangent of the estimated rotational position of magnet 100 according to:

$$\psi_{0,a}' = \arctan 2\{\text{Re}\{\sigma_{a,1}\}, \text{Im}\{\sigma_{a,1}\}\}$$

Here, primed angles denote estimations of angles; thus, they may contain angle errors. Conversely, unprimed angles denote the exact geometrical angles.

In other words, circuitry 410 can be configured to estimate an angular position of magnet 110 by combining signals from the sensor devices related to the magnetic field induced by magnet 110 and sensed by half-bridge circuits 200. Thereby the signal of each sensor device can uniquely and/or unambiguously determine the cosine of the magnetic angle at the location of the sensor device. The combining of signals from the plurality of sensor devices comprises two real-valued weighted summations over the signals, whereby the weights of a first sum are proportional to the sine of the azimuthal positions of the respective sensor units and the weights of a second sum are proportional to the cosine of the azimuthal positions of the respective sensor units. Moreover, the combining also comprises the arctan 2 operation (above) on both sums.

Figure 3B:
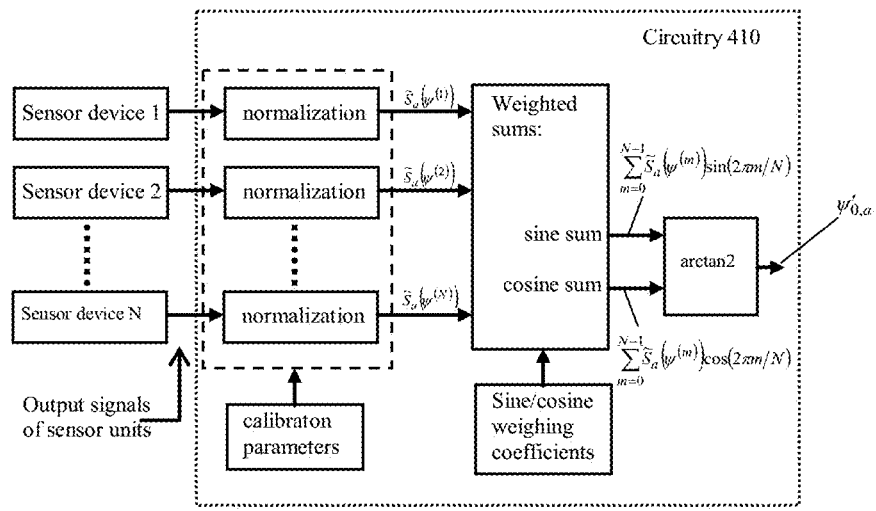
FIG. 3B is a block diagram of a sensor system signal flow according to an embodiment.

Referring also to FIG. 3B, a sensor device can comprise a half-bridge circuit, e.g., a GMR half-bridge circuit, having an output voltage $$V_{outx} = V_{supply} \frac{1 + h\cos\angle(\vec{B}_{in-plane}, \vec{n}_x)}{2}$$

as discussed above. Circuitry 410 can receive this signal and, in embodiments, perform at least one pre-conditioning operation before determining a sum of the signals from the plurality of half-bridge circuits or other sensor devices and ultimately the angular position of the magnet. In one embodiment, circuitry 410 first can subtract Vsupply/2 to reduce or remove the large common mode voltage of the half-bridge output. In practice there still may be some small offset present, caused by mismatch between the MRs in any half-bridge. In embodiments, circuitry 410 can comprise a memory in which to store this offset, or the offset can be determined in operation, e.g., after one or more revolutions of the magnet, simply by taking the mean of maximum and minimum output voltage. Thus, the offset can be identified and subtracted from the signal.

The amplitude of the signal is h*Vsupply, with the term "h" is subject to process-spread and part-to-part-mismatch. This term also often is stored in a memory or observed during prior revolutions (i.e., simply by computing maximum minus minimum output voltage from the output signals of all sensor units). Consequently, circuitry 410 can normalize all signals from amplitude h*Vsupply to 1. Moreover, the reference directions of the half-bridges are subject to tolerances, which can be caused by misalignment errors when the pinned layers of MRs are magnetized in the production, but they also can be caused by placement tolerances of the sensor dies around the rotation axis. The sensor system may also know these assembly errors from prior off- or on-line calibration runs and manipulate the signals accordingly.

Finally, circuitry 410 arrives at a set of normalized signals. The sums $$\sigma_{a,n} = \sum_{m=0}^{N-1} \tilde{S}_a(\psi^{(m)}) \exp(2\pi jmn/N)$$

then can be computed with these normalized signals $\tilde{S}_a(\psi^{(m)})$.

System 400 in FIG. 4A comprises N=3 test points, though other embodiments may comprise more or fewer. For example, some embodiments can comprise an even number of test points, as depicted, e.g., in FIG. 4B, and in these embodiments two diametrically opposed half-bridges 200a and 200b can be grouped together in a system 401, and a difference in the output voltages therebetween tapped. This is similar to a full-bridge circuit configuration (refer, for example, to FIG. 2D) except that half-bridge circuits 200a and 200b are a different positions.

Figure 4B:
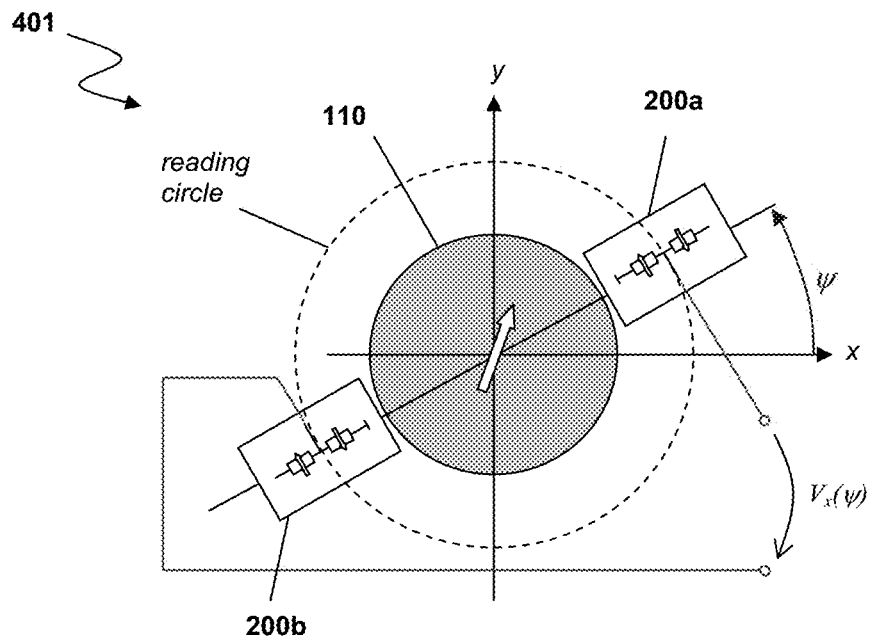
FIG. 4B is a schematic plan view of a sensor system according to an embodiment.

FIG. 4B also depicts a different reference direction for half-bridge circuits 200a and 200b. Here the reference direction is parallel and anti-parallel to the tangential direction, whereas in FIG. 4A it is parallel and anti-parallel to the radial direction. In embodiments the reference direction can be arbitrary, and it could also be aligned with the x-axis in FIG. 4B for all of the sensor devices. Comparing FIGS. 4A and 4B, the sensor devices have reference directions $\pm\vec{n}_R$ and $\pm\vec{n}_\psi$. Because of the equality $\cos\angle(\vec{B}_{in-plane}, \vec{n}_R) = \sin\angle(\vec{B}_{in-plane}, \vec{n}_\psi)$, the normalized signals of the sensor units in FIG. 4A are proportional to the cosine of the magnetic angles, whereas the normalized signals of the sensor units in FIG. 4B are proportional to the sine of the magnetic angles. Thus, normalized signals of sensor devices which are proportional to the sine or cosine of the magnetic angle can be used, in other words the normalized signals of sensor units are proportional to the (co)sine of the magnetic angle.

Figure 4C:
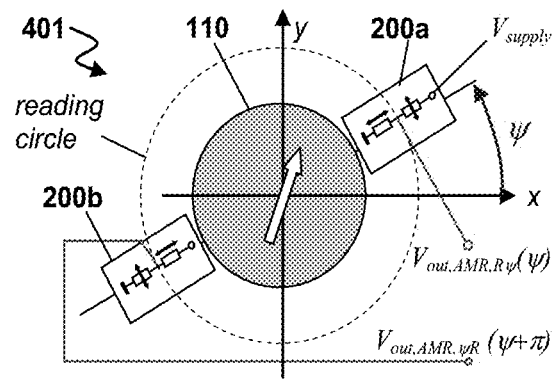
FIG. 4C is a schematic plan view of a sensor system according to an embodiment.

Another embodiment comprises AMRs. FIG. 4C depicts an arrangement with two AMR half-bridge circuits 200a and 200b at azimuthal positions $\psi$ and $\psi+\pi$. AMRs have no pinned magnetization, and their reference direction is determined by the direction of current flow (which is often defined by Barber poles). Since the resistance of AMRs does not depend on the polarity of the current, this is denoted by using bidirectional black arrows in FIG. 4C. The output voltages are given by $$V_{out,AMR,R\psi} = V_{supply} \frac{1 + h\cos^2\angle(\vec{B}_{in-plane}, \vec{n}_R)}{2+h},$$

$$V_{out,AMR,\psi R} = V_{supply} \frac{1 + h\cos^2\angle(\vec{B}_{in-plane}, \vec{n}_\psi)}{2+h}$$

The difference of both divided by $V_{supply}h/(2+h)$ gives the normalized signal $$S_{AMR,R\psi} = \frac{B_R^2 - B_\psi^2}{B_R^2 + B_\psi^2} = \frac{\hat{B}_R^2 \cos^2(\psi-\psi_0) - B_\psi^2 \sin^2(\psi-\psi_0)}{\hat{B}_R^2 \cos^2(\psi-\psi_0) + B_\psi^2 \sin^2(\psi-\psi_0)}$$

If these signals are sampled at N test points at azimuthal positions $\psi = m \times 360°/N$ with $m=0, 1, \ldots, N-1$, the system can determine the discrete Fourier transform $$\sigma_{AMR,R\psi,n} = \sum_{m=0}^{N-1} S_{AMR,R\psi}(\psi^{(m)}) \exp(2\pi jmn/N)$$

where for N=3 the first and second harmonics (n=1, 2) and for N>4 the second and (N−2)th harmonic (n=2 and N−2) carry the information on the rotational position of magnet 110, while all other harmonics show up only for system imperfections like different amplitudes of radial and azimuthal field, assembly tolerances, and background magnetic disturbances. For N≠4, the rotation angle of the magnet is given by $\psi_{0,AMR,R\psi}' = 0.5 \times \arctan_2\{Re\{\sigma_{AMR,R\psi,2}\}, Im\{\sigma_{AMR,R\psi,2}\}\}$ Thus, GMR, TMR and CMR half-bridges comprise MRs with anti-parallel reference directions of their pinned layers, whereas AMR half-bridges comprise MRs with orthogonal reference directions defined by the current flow direction. The output signals of GMR, TMR and CMR half-bridges depend on the cosine or sine of the magnetic angle, whereas the output signals of the AMR half-bridges depend on the square of the cosine or sine of the magnetic angle. In both situations the angle sensor system estimates the rotational position of the magnet via a discrete Fourier transform or other suitable calculation or processing of the signals of the sensor units, yet in the case of GMR, TMR and CMR (i.e., those MRs with pinned layers) it uses the fundamental frequency n=1, whereas in the case of AMRs (i.e., MRs without pinned layers) it uses the second harmonic frequency n=2. The second harmonic is unique only in an angular range of 180° so that without further modifications of the system an AMR off-axis angle sensor cannot distinguish between rotational position $\psi_0$ and $\psi_0+\pi$ of the magnet, though this can be taken into consideration as appropriate in embodiments and applications.

If an embodiment of a sensor system has N half-bridges at N azimuthal locations $\psi=\psi^{(m)}$ with output voltages $V_{outx}(\psi^{(m)})$ for m=0, 1, ..., N−1, then it is possible to tap the voltages across, e.g., neighboring half-bridges:

$$V_{outx}(\psi^{(1)})-V_{outx}(\psi^{(0)}), V_{outx}(\psi^{(2)})-V_{outx}(\psi^{(1)}), \ldots, V_{outx}(\psi^{(N-1)})-V_{outx}(\psi^{(N-2)})$$

This provides N−1 differential voltages. The N-th voltage can be referred to an absolute point (and none of the other half-bridge outputs), $V_{outx}(\psi^{(0)})-V_{ref}$, in order to have N linear independent equations. Alternatively, the sensor system can include an additional half-bridge located at a further position, to which all other half-bridge outputs are referred. For example, if it is assumed that the half-bridge #N is this further reference bridge, the sensor system can tap the N differential voltages $V_{outx}(\psi^{(0)})-V_{outx}(\psi^{(N)})$, $V_{outx}(\psi^{(1)})-V_{outx}(\psi^{(N)})$, ..., $V_{outx}(\psi^{(N-1)})-V_{outx}(\psi^{(N)})$, whereby the half-bridges #0 to #(N−1) are on the regular positions $\psi=\psi^{(0)}$ to $\psi=\psi^{(N-1)}$, and the further reference bridge is at a position $\psi=\psi^{(N)}$ that is different from all other positions. Thus, in one embodiment all (N+1) bridges must be at different positions. As previously mentioned, it can be advantageous in embodiments for the N bridges to be arranged on a regular grid $\psi=\psi^{(0)}+2\pi m/N$ for m=0, 1, ..., N−1, such that the further reference bridge can be arranged at an irregular position off-grid.

If there is no disturbance magnetic field, and if the magnitudes of $\hat{B}_R$ and $\hat{B}_\psi$ are identical, such a sensor system can have zero angle error for N≥3. Yet, for arbitrary magnets 110 and arbitrary locations of the reading circle, the magnitudes of $\hat{B}_R$ and $\hat{B}_\psi$ differ, and even if the reading circle is carefully arranged such that both magnetic field magnitudes are nominally identical, they can differ slightly due to assembly tolerances and production spread. In these cases, the angle error can decrease with larger N, yet not monotonously. For example, a system with N=4 typically will have a larger angle error than a system with N=3. Moreover, a system with N=6 can have the same error as for N=3, though a system with N=5 can have an even smaller angle error. Generally, systems having an odd N can have a lower angle error. A system with N=2*i+1 can have the same angle error as a system with N=4*i+2. The angle error also can depend on how much the ratio of magnitudes of $\hat{B}_R$ and $\hat{B}_\psi$ differs from 1.

Figure 5A:
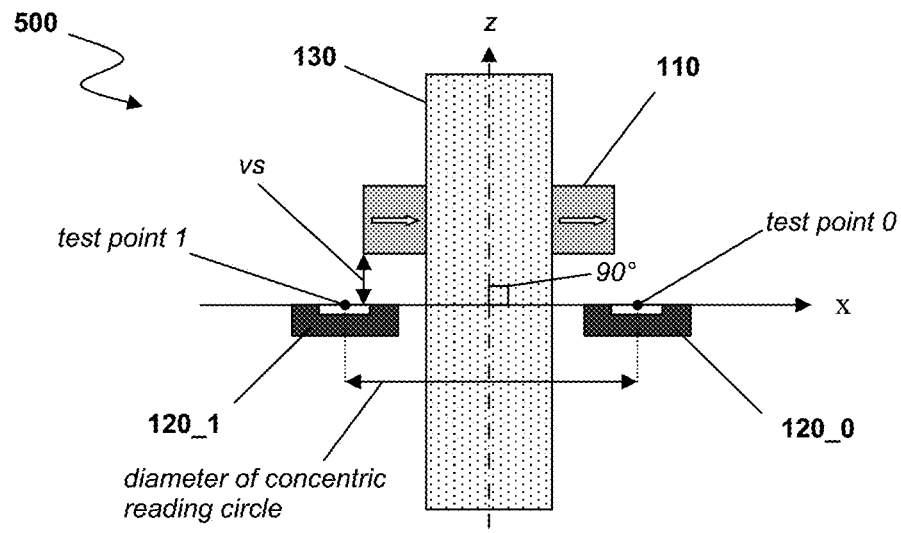
FIG. 5A is a side cross-sectional view of a sensor system according to an embodiment.

Another embodiment of a sensor system 500 is depicted in FIG. 5A. In system 500, magnet 110 comprises a ring magnet mounted or otherwise fixed to a shaft 130 such that magnet 110 rotates with shaft 130 in operation. The z rotation axis is aligned with a center of shaft 130. Magnet 110 is diametrically magnetized as illustrated by the arrows in FIG. 5A. Two sensor devices 120_0 and 120_1 are depicted, arranged diametrically opposite one another and with the diameter of the concentric reading circle. Additional sensor devices 120_n can be included though are not depicted or visible in FIG. 5A.

Figure 5B:
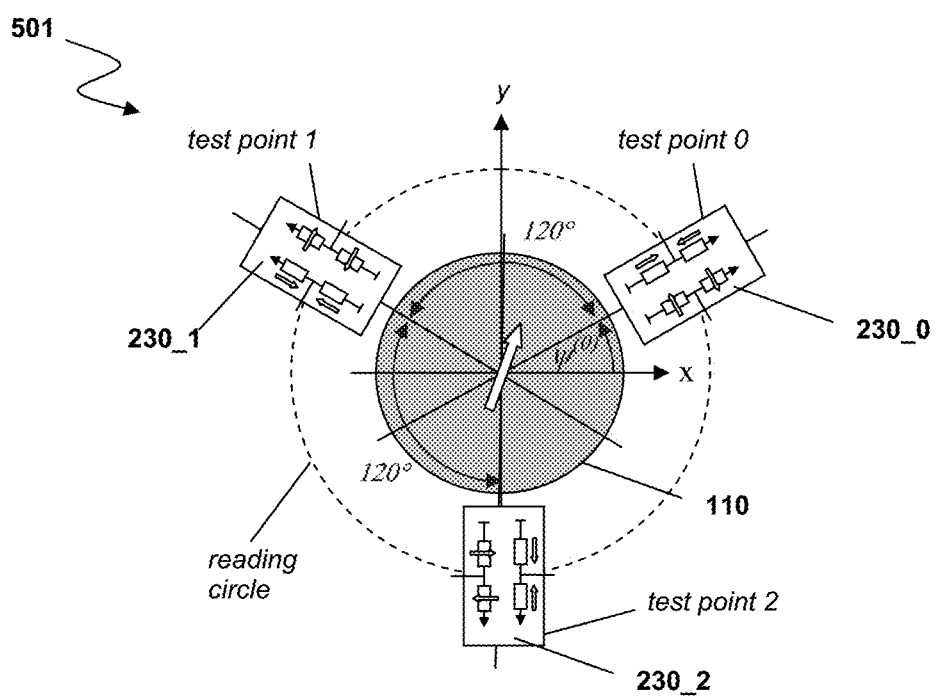
FIG. 5B is a schematic plan view of a sensor system according to an embodiment.

For example, FIG. 5B comprises three sensor devices 230_0, 230_1 and 230_2. Embodiments with odd N (the number of test points at each of which a sensor device 120 is arranged) can be more efficient. N=3 can be sufficiently accurate and have adequate background field suppression in many applications. N=5 can be better than N=3, and N=6 can be similar to N=3. N=10 can be similar to N=5. N=4 can be generally less accurate than N=3 or N=5. In general, N can be selected according to a particular application and/or desired performance characteristics.

Sensor devices 120_0 and 120_1 (FIG. 5A, though the same can be true for other embodiments, e.g., FIG. 5B) are spaced apart from magnet 110 by a vertical (as arranged on the page in FIG. 5A and the orientation of which can vary in embodiments) distance vs. Each sensor 120_0 and 120_1 (230_1, 230_2 and 230_3 in FIG. 5B) comprises two half-bridges (not visible) with reference directions $\vec{a}$ and $\vec{b}$, each parallel with the (R,Ψ)-plane and with an angle between that is not 0° or 180° in embodiments (thus $\vec{a}$ and $\vec{b}$ are not collinear). In one embodiment, $\vec{a}$ and g are perpendicular and correspond to $\vec{n}_R$ and $\vec{n}_\psi$, which will be assumed in this example discussion but can vary in other embodiments. System 500 has N test points at azimuthal positions in an embodiment:

$$\psi^{(m)}=\psi^{(0)}, \psi^{(0)}+360°/N, \psi^{(0)}+2\times 360°/N, \ldots$$

In operation, the system (e.g., 500 or 501) samples (e.g., by control circuitry analogous to circuitry 410 of FIG. 3) the signals $\tilde{S}_a(\psi^{(m)})$ and $\tilde{S}_b(\psi^{(m)})$ for m=0, 1, ..., N−1, derived from half-bridges with reference directions $\underline{a}$ and $\underline{b}$. Then, the system computes $$\sigma_{a,n} = \sum_{m=0}^{N-1} \tilde{S}_a(\psi^{(m)})\exp(2\pi jmn/N)$$

and $$\sigma_{b,n} = \sum_{m=0}^{N-1} \tilde{S}_b(\psi^{(m)})\exp(2\pi jmn/N)$$

for n=0, 1, ..., N−1 with the imaginary unit $j=\sqrt{-1}$.

Figure 5C:
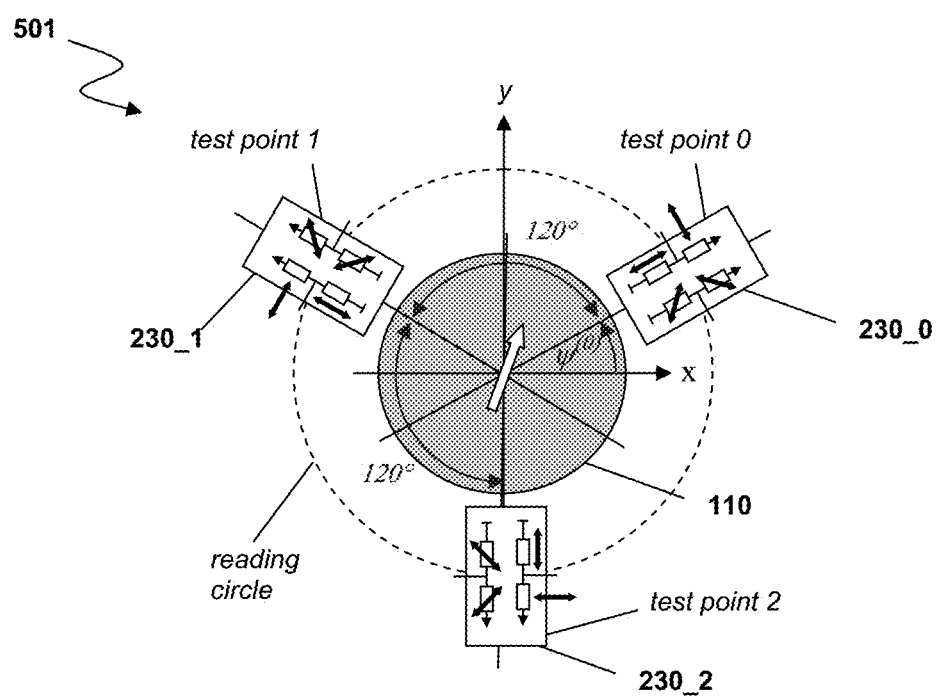
FIG. 5C is a schematic plan view of a sensor system according to an embodiment.

If the sensor devices use MRs with pinned layers (e.g., GMRs, TMR, and/or CMRs), as depicted in FIG. 5B, the fundamental frequencies $\sigma_{a,1}$ and $\sigma_{b,1}$ (n=1) represent the dominant part of the field of magnet 110 including information on the rotational position of the magnet, whereas the mean (n=0) and the higher harmonics (n>1) are caused by non-idealities like background magnetic disturbance, eccentric mounting of magnet or sensors versus rotation axis, sensor errors, magnet errors (e.g. deviation from spatial sinusoidal fields) and others. In embodiments, $\sigma_{a,N-n}$ is the conjugate of $\sigma_{a,n}$ which means that both contain the same information on the rotational position of the magnet and thus any can be used. If the sensor devices use MRs without pinned layers (e.g, AMRs), as is depicted in FIG. 5C, the second harmonics $\sigma_{a,2}$ and $\sigma_{b,2}$ (n=2) represent the dominant part of the field of magnet 110. Thus, in embodiments with pinned layer MRs, the sensor system needs only compute the fundamental frequency, whereby the ratio of real and imaginary parts thereof gives the tangent of the estimated rotational position of the magnet:

$$\psi_{0,a}'=\mathrm{mod}\{\arctan 2\{Re\{\sigma_{a,1}\}, Im\{\sigma_{a,1}\}\}, 360°\} \text{ and}$$
$$\psi_{0,b}'=\mathrm{mod}\{\arctan 2\{Re\{\sigma_{b,1}\}, Im\{\sigma_{b,1}\}\}, 360°\}$$

In the absence of angle errors and for $a=\vec{n}_R$ and $b=\vec{n}_\psi$ and $\hat{B}_R>0$ and $\hat{B}_\psi>0$, it holds that:

$$\psi_{0,a}'=\psi_0 \text{ and } \psi_{0,b}'=\mathrm{mod}\{\psi_0+90°, 360°\} \text{ for } 0\leq\psi_0<360°$$

Then, the system can compute a pre-conditioned average (i.e., adding or subtracting integer multiples of 360 degrees to the angle outputs of the sensor devices until all of the values are either rising or falling when reviewed in a clockwise direction) of both angles according to:

If $\psi_{0,b}' < \psi_{0,a}'$, then add 360° to $\psi_{0,b}'$ $\psi_0' = \text{mod}\{(\psi_{0,a}' + \psi_{0,b}' - 90°)/2; 360°\}$ A pre-conditioned average can be more accurate than a single value of a single sensor device, as it can reduce or cancel errors related to different magnitudes of $B_R$ and $B_\psi$ amplitudes, reduce or eliminate errors related to assembly tolerances, and/or reduce or cancel disturbance magnetic fields.

For good suppression of background magnetic disturbances, $\hat{B}_R$ and $\hat{B}_\psi$ should be as similar as possible (ideally $\hat{B}_R = \hat{B}_\psi$ in an embodiment) and have the same sign. For cylindrical or ring-shaped magnets, this means that the plane in which all test points are located and which is perpendicular to the rotation axis z is different from the symmetry plane of magnet 110; in other words, it is shifted in an axial direction such that the test points lie above or below magnet 110, as is depicted in FIG. 5A. Thus, in an example embodiment corresponding to system 500, magnet 110 comprises a ring magnet with an inner diameter of about 5 mm, an outer diameter of about 15 mm and a thickness (e.g., in the z-direction as in FIG. 5A) of about 3 mm. Test points 0 and 1 are at vs=about 1.5 mm below magnet 110. The reading circle has a diameter of about 17.4 mm if shaft 130 is non-ferrous (e.g., its relative permeability is close to 1), and if shaft 130 is ferrous (e.g., its relative permeability is greater than about 1,000), the reading circle can have a different diameter. The signs of $\hat{B}_R$ and $\hat{B}_\psi$ can be the same, for good suppression of background magnetic fields and disturbances, with radial test positions 0 and 1 being outside the outer diameter of magnet 110, as depicted.

An embodiment of a system 501 comprising MRs having pinned layers and in which N=3 and for $\vec{a} = \vec{n}_R$, and $\vec{b} = \vec{n}_\psi$ and $\hat{B}_R > 0$ and $\hat{B}_\psi > 0$ is depicted in FIG. 5B. System 501 comprises three test points 0, 1 and 2 at regular azimuthal spacings of about 120° on a reading circle concentric to the rotation axis z of a diametrically magnetized magnet 110. Each test point 0, 1, 2 comprises a sensor device 120_0, 120_1, 120_2, respectively, each of which comprises at least two half-bridges having different reference directions as illustrated by the arrows on or adjacent each MR element. In embodiments in which AMRs are used, which do not include pinned layers, the two reference directions mean, e.g., that the AMRs of the first half-bridge have reference directions parallel to $\pm \vec{n}_R$ and $\pm \vec{n}_\psi$, whereas the AMRs of the second half-bridge have reference directions parallel to $\pm(\vec{n}_R + \vec{n}_\psi)$ and $\pm(\vec{n}_R - \vec{n}_\psi)$ as shown in FIG. 5C.

In the example embodiments of FIGS. 5B and 5C, the reference directions of neighboring test points (e.g., 0 and 1, 1 and 2, 2 and 0) are also rotated by about 120°, though this need not be the case in every embodiment as they can also be identical (e.g., instead of R- and Ψ-reference directions as depicted, system 501 can also use the same global x- and y-reference directions for all test points). This is because the signals given by any two reference directions can be recalculated into any other set of reference directions which is equivalent. In one embodiment, both MR half-bridges at each test point 0, 1, 2 are arranged on a single die 230_0, 230_1 and 230_2, respectively. This can reduce or minimize production costs, the total areas of the dies, and mounting tolerances of the dies (i.e., because the relative positions of both MR half-bridges can be accurate up to micro-meter levels if they are manufactured on a single die, whereas the relative position of two dies is typically on the order of 50 . . . 150 μm if standard and economic pick-and-place and standard die-attach methods for the assembly of micro-electronic circuits are used).

For MRs having pinned layers with reference directions $\vec{a} = \vec{n}_R$ and $\vec{b} = \vec{n}_\psi$, the signals at azimuthal position $\psi$ are $$\tilde{S}_a = 0.5 \times B_R / \sqrt{B_R^2 + B_\psi^2} = 0.5 \times \hat{B}_R \cos(\psi - \psi_0) / \sqrt{B_R^2 \cos^2(\psi - \psi_0) + B_\psi^2 \sin^2(\psi - \psi_0)}$$

$$\tilde{S}_b = 0.5 \times B_\psi / \sqrt{B_R^2 + B_\psi^2} = 0.5 \times \hat{B}_\psi \sin(\psi - \psi_0) / \sqrt{B_R^2 \cos^2(\psi - \psi_0) + B_\psi^2 \sin^2(\psi - \psi_0)}$$

Hence with $\psi^{(0)} = 0$, according to a first algorithm, system 501 can compute, e.g., for N=3:

$$\sigma_{a,1} = \sum_{m=0}^{2} 0.5 \times \hat{B}_\psi \sin(2\pi m / 3 - \psi_0)$$

$$\exp(2\pi j m / 3) / \sqrt{B_R^2 \cos^2(2\pi m / 3 - \psi_0) + B_\psi^2 \sin^2(2\pi m / 3 - \psi_0)}$$

$$\sigma_{b,1} = \sum_{m=0}^{2} 0.5 \times \hat{B}_R \cos(2\pi m / 2 - \psi_0)$$

$$\exp(2\pi j m / 3) / \sqrt{B_R^2 \cos^2(2\pi m / 3 - \psi_0) + B_\psi^2 \sin^2(2\pi m / 3 - \psi_0)}$$

from which one can obtain the rotation angle in several ways, e.g., $\psi_0' = \arctan_2\{Re\{\sigma_{a,1}\}, Im\{\sigma_{a,1}\}\} - 90°$, $\psi_0' = \arctan_2\{Re\{\sigma_{b,1}\}, Im\{\sigma_{b,1}\}\}$, or $\psi_0' = \arctan_2\{Re\{\sigma_{b,1} - j\sigma_{a,1}\}, Im\{\sigma_{b,1} - j\sigma_{a,1}\}\}$, or according to If $\psi_{0,b}' < \psi_{0,a}'$, then add 360° to $\psi_{0,b}'$ and $\psi_0' = \text{mod}\{(\psi_{0,a}' + \psi_{0,b}' - 90°)/2; 360°\}$ as previously discussed. For $\hat{B}_R = 1$ and $\hat{B}_\psi = 0.8$ and vanishing disturbance fields, the signals shown in TABLE 1 can be obtained for various angular positions $\psi_0$ of magnet.

TABLE 1

| $\psi_0$ | $\sigma_{a,1}$ | $\sigma_{b,1}$ | $\psi_{0,a}'$ | $\psi_{0,b}'$ | $\psi_0'$ |
|---|---|---|---|---|---|
| 0° | 0.79260287 + j × 0 | 0 + j × 0.702246883 | 0 | 90° | 0° |
| 1° | 0.79247171 + j × 0.0134316 | −0.012577 + j × 0.702154548 | 0.971012° | 91.026173° | 0.99859° |
| 3° | 0.79207835 + j × 0.0268619 | −0.025148588 + j × 0.701877446 | 1.942336° | 92.052056° | 1.99720° |
| 270° | 0 − j × 0.786213628 | 0.709656967 + j × 0 | 270° | 0° | 270° |
| 271° | 0.014124 − j × 0.786104419 | 0.709534134 + j × 0.012062968 | 271.0293° | 0.9740061° | 271.0017° |
| 287° | 0.23459 − j × 0.754456542 | 0.675241236 + j × 0.203298431 | 287.2725° | 16.755749° | 287.0141° |

Alternatively, system 501 of FIG. 5B can use another methodology and/or algorithm to derive the rotational position of magnet 100 in other embodiments. For example, system 501 can determine the magnetic angles $\psi_{0,m}'$ for m=0, 1 ... N−1. An advantage of this methodology is that the test points can have regular or irregular spacings. In such an embodiment, the sensor system can determine, for $\vec{a}=\vec{n}_R$ and $\vec{b}=\vec{n}_\psi$, the following:

$$\psi_{0,m}'=\mathrm{mod}(\psi^{(m)}-\arctan 2\{\mathrm{sign}(\hat{B}_R)\tilde{S}_a(\psi^{(m)}),\mathrm{sign}(\hat{B}_\psi)\tilde{S}_b(\psi^{(m)})\},360°)$$

for m=0, 1, . . . , N−1. As can be seen here, sensor device 120 at each test point samples the magnetic angle arctan 2{sign $(\hat{B}_R)\tilde{S}_a(\psi^{(m)})$, sign$(\hat{B}_\psi)\tilde{S}_b(\psi^{(m)})$} (and not just its (co)sine) and subtracts its azimuthal position $\psi^{(m)}$ to obtain a coarse angle estimation $\psi_{0,m}'$. Contrast this with system 501 (and, e.g, systems 400 and 600 discussed below) in which an angle estimation is determined only from a combination of N test points.

Then, the system can pre-condition N angles to obtain a monotonously rising or falling sequence of numbers:

IF $\psi_{0,l}'>\psi_{0,m}'+180°$ THEN $\psi_{0,l}':=\psi_{0,l}'-360°$

ELSE IF $\psi_{0,l}'<\psi_{0,m}'-180°$ THEN $\psi_{0,l}':=\psi_{0,l}'+360°$

ELSE do not change $\psi_{0,l}'$

In embodiments, angles other than 180° can be used, e.g., angles between 90° and 270°, or between 45° and 315°, though the robustness of the determination with respect to unbiased statistical angle errors (i.e., that neither positive nor negative angle errors prevail) can be maximized in embodiments with 180°. There are two possibilities: (i) this is done for m=0 and l=1, 2, . . . , N−1, or (ii) this is done for m=l−1 and l=1, 2, . . . , N−1. In other words, a goal of the pre-conditioning is to avoid that some of the coarse angle estimations are located near 0° while others are located near 360°, so the preconditioning either adds 360° to the values near 0° or it subtracts 360° from values near 360°.

Finally, the system determines the average of all pre-conditioned angle estimations according to $$\psi_0' = \mathrm{mod}\left\{\sum_{l=0}^{N-1} \psi_{0,l}'/N; 360°\right\}.$$

Figure 5D:
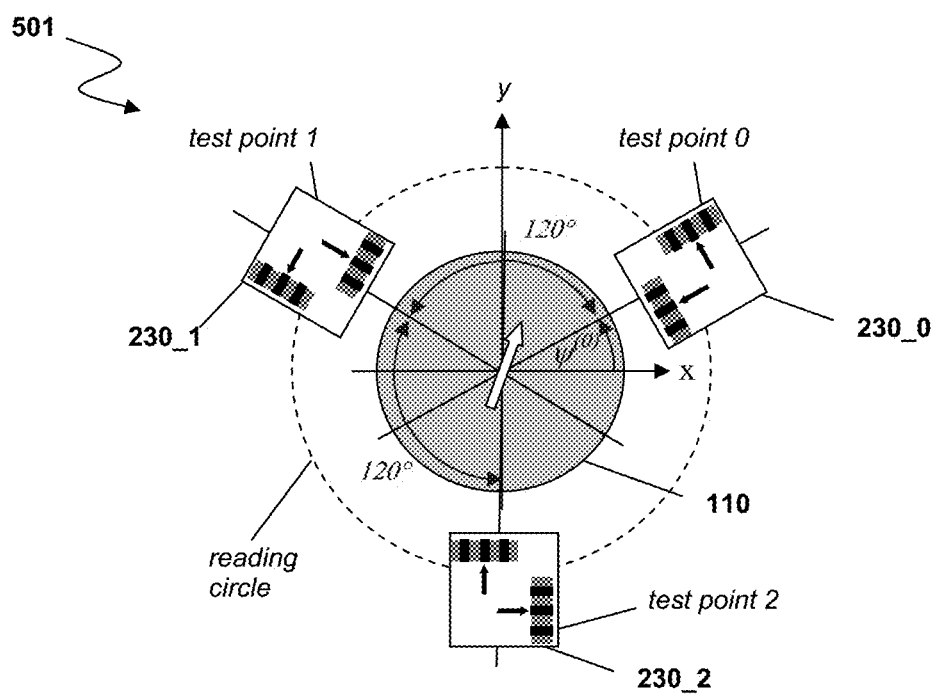
FIG. 5D is a schematic plan view of a sensor system according to an embodiment.

This approach generally can be used with any kind of magnetic angle sensor. Thus, the sensor device can use two (or more) half-bridge circuits comprising MRs, such as is shown in FIG. 5B, yet it can also use different sensor technologies, including vertical Hall devices to measure the magnetic angle at the respective test point of the sensor device. An example of such a system 501 is shown in FIG. 5D. Each test point device comprises two vertical Hall effect devices sensitive to in-plane magnetic fields along two directions which are not co-planar, such as orthogonal, e.g., radial and azimuthal as illustrated by the black arrows in FIG. 5D. Vertical Hall devices with three, four, five or even more contacts per device can be used, and FIG. 5D shows three-contact devices merely as an example. The figure is not to scale, and in practice it can be advantageous to make the vertical Hall effect devices as small as possible and to arrange them as close together as possible. Moreover, a common centroid layout for the Hall devices can be used in embodiments.

With two orthogonal vertical Hall effect devices, then, the sensor device samples the components $B_R$ and $B_\psi$, which include the same information about the magnetic angle as the signals $B_R/\sqrt{B_R^2+B_\psi^2}$ and $B_\psi/\sqrt{B_R^2+B_\psi^2}$, which are detected by two orthogonal half-bridge circuits with MRs with pinned layers as discussed above. The magnetic angle is the angle between the vector $B_R\vec{n}_R+B_\psi\vec{n}_\psi$ and a reference direction (e.g., $\vec{n}_x$) which is identical to the angle between the vector $B_R/\sqrt{B_R^2+B_\psi^2}\vec{n}_R+B_\psi/\sqrt{B_R^2+B_\psi^2}\vec{n}_\psi$ and the same reference direction.

In general, and as in other embodiments, this system can be optimized if $\hat{B}_R$ and $\hat{B}_\psi$ have the same sign. For cylindrical magnets, this can be achieved at radial distances larger than half of the outer diameter of the magnet. Optimal suppression of background magnetic fields is achieved if $\hat{B}_R=\hat{B}_\psi$. For cylindrical magnets this can be achieved in embodiments at radial distances slightly larger than half of the outer diameter of the magnet and axial positions lightly above or below the magnet.

Sensor systems according to FIGS. 5B, 5C and 5D, and in general other sensor systems which use sensor devices that measure the magnetic angle and not only its (co)sine, can also use a slightly different methodology to determine the rotational position of the magnet. Sensor device 230_0 in FIG. 5D, for example, is located at azimuthal position $\psi^{(0)}$ where it measures the components $B_R=\hat{B}_R \cos(\psi^{(0)}-\psi_0)$ and $B_\psi=\hat{B}_\psi \cos(\psi^{(0)}-\psi_0)$, which can be viewed as first and second coordinates of a pointer with a magnetic angle $\angle\{\hat{B}_R \cos(\psi^{(0)}-\psi_0)\vec{n}_1+\hat{B}_\psi \cos(\psi^{(0)}-\psi_0)\vec{n}_2,\vec{n}_1\}=\arctan_2(\hat{B}_R \cos(\psi^{(0)}-\psi_0),\hat{B}_\psi \cos(\psi^{(0)}-\psi_0))$ between this pointer and the unit vector along the direction of the first coordinate (with $\vec{n}_1, \vec{n}_2$ being orthonormal vectors). Second sensor device 230_1 is located at azimuthal position $\psi^{(0)}-2\pi/3$ and thus its magnetic angle is $\arctan_2(\hat{B}_R \cos(\psi^{(0)}-\psi_0-2\pi/3),\hat{B}_\psi \cos(\psi^{(0)}-\psi_0-2\pi/3))$. So if the amplitudes $\hat{B}_R$ and $\hat{B}_\psi$ are identical, the pointer at second sensor device 230_1 is simply rotated by 120° against the pointer of first sensor device 230_0. Even if $\hat{B}_R \neq \hat{B}_\psi$, the system can perform a coordinate rotation to turn the pointer of second sensor device 230_1 back near to the pointer of first sensor device 230_0:

$$\begin{pmatrix} \cos(2\pi/3) & -\sin(2\pi/3) \\ \sin(2\pi/3) & \cos(2\pi/3) \end{pmatrix} \cdot \begin{pmatrix} \hat{B}_R\cos(\psi^{(0)}-\psi_0-2\pi/3) \\ \hat{B}_\psi\cos(\psi^{(0)}-\psi_0-2\pi/3) \end{pmatrix}$$

This way the system can proceed with the signals of all sensor devices. For the m-th sensor device at azimuthal position $-\psi^{(m)}$, the system transforms its signals $\tilde{S}_a, \tilde{S}_b$ by the matrix multiplication $$\begin{pmatrix} \tilde{S}_a^{transformed}(\psi^{(m)}) \\ \tilde{S}_b^{transformed}(\psi^{(m)}) \end{pmatrix} = \begin{pmatrix} \cos(2\pi m/N) & -\sin(2\pi m/N) \\ \sin(2\pi m/N) & \cos(2\pi m/N) \end{pmatrix} \cdot \begin{pmatrix} \tilde{S}_a(\psi^{(m)}) \\ \tilde{S}_b(\psi^{(m)}) \end{pmatrix}$$

which is a simple set of two real-valued linear equations with constant coefficients $\cos(2\pi m/N)$, $\sin(2\pi m/N)$. This transformation can also be viewed as a pre-conditioning procedure. It can be advantageous in embodiments to normalize the signals prior to this matrix multiplication according to $\tilde{S}_a(\psi^{(m)}) \rightarrow \tilde{S}_a(\psi^{(m)})/\sqrt{\tilde{S}_a^2(\psi^{(m)})+\tilde{S}_b^2(\psi^{(m)})}$, $\tilde{S}_b(\psi^{(m)}) \rightarrow \tilde{S}_b(\psi^{(m)})/\sqrt{\tilde{S}_a^2(\psi^{(m)})+\tilde{S}_b^2(\psi^{(m)})}$. Next the system adds up all pointers $$\begin{pmatrix} \tilde{S}_a^{sum} \\ \tilde{S}_b^{sum} \end{pmatrix} = \sum_{m=0}^{N-1} \begin{pmatrix} \tilde{S}_a^{transformed}(\psi^{(m)}) \\ \tilde{S}_b^{transformed}(\psi^{(m)}) \end{pmatrix}$$

whereby this summation can also be viewed as an averaging process times N (whereby this scalar number N is irrelevant in the context of angular determination). Finally, the rotational position of the magnet is given as the angle between this pointer and the unit vector along the direction of the first coordinate $\angle\{\tilde{S}_a^{sum}\vec{n}_1 + \tilde{S}_b^{sum}\vec{n}_2, \vec{n}_1\} = \arctan_2\{\tilde{S}_a^{sum}, \tilde{S}_b^{sum}\}$. Thus, this algorithm does not compute a pre-conditioned average of magnetic angles sampled by the N sensor units; instead it transforms the magnetic pointer at each sensor device into a transformed angular position (which can be identical to the angular position of the first sensor device, but generally any angular position can be chosen), adds up these transformed pointers and determines the angle of this pointer with a reference direction. An advantage of this approach is that the transformation can require less computing power and the system needs to perform the arctan calculation only once. This can speed up computation, use less power and need less chip area.

Figure 6A:
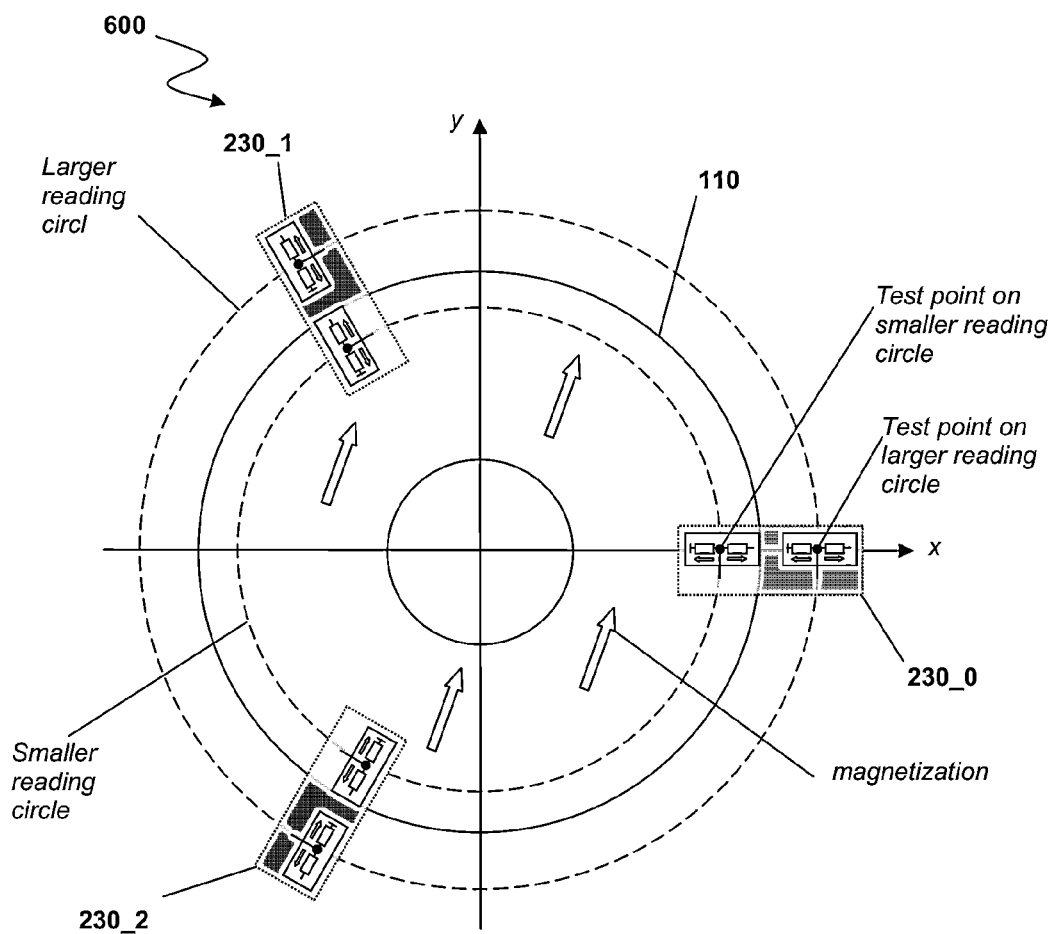
FIG. 6A is a schematic plan view of a sensor system according to an embodiment.

Another system 600 is depicted in FIG. 6A. System 600 comprises test points on two concentric reading circles. The larger and smaller circles can be on the same plane, as depicted, or on different planes (i.e., different z-positions), and can be larger or smaller (or one larger and one smaller) than a diameter of magnet 110. To improve suppression of background magnetic fields, the signs of $\hat{B}_R$ and $\hat{B}_\psi$ are the same on one reading circle and different on the other reading circle in one embodiment. At each test point on each reading circle (N=3 for each reading circle in system 600, though there can be a different number of test points on each circle in other embodiments), a half-bridge with reference direction $\vec{a}$, parallel to the (R,Ψ)-plane and the same as $\vec{n}_R$, is arranged. In some embodiments the reference directions on the reading circles differ. Thus, on each reading circle system 600 has N test points at azimuthal positions $\psi^{(m)} = \psi^{(0)}, \psi^{(0)} + 360°/N, \psi^{(0)} + 2\times 360°/N, \ldots$. In other embodiments, as mentioned, N is different for each reading circle, and $\psi^{(0)}$ can differ for each reading circle. This can be advantageous, e.g., if half-bridge circuits for test-points on both reading circles are located on the same die, because then the direction between both test points can be tilted against the radial direction in order to match the spacing to the difference in required reading radii.

Figure 6B:
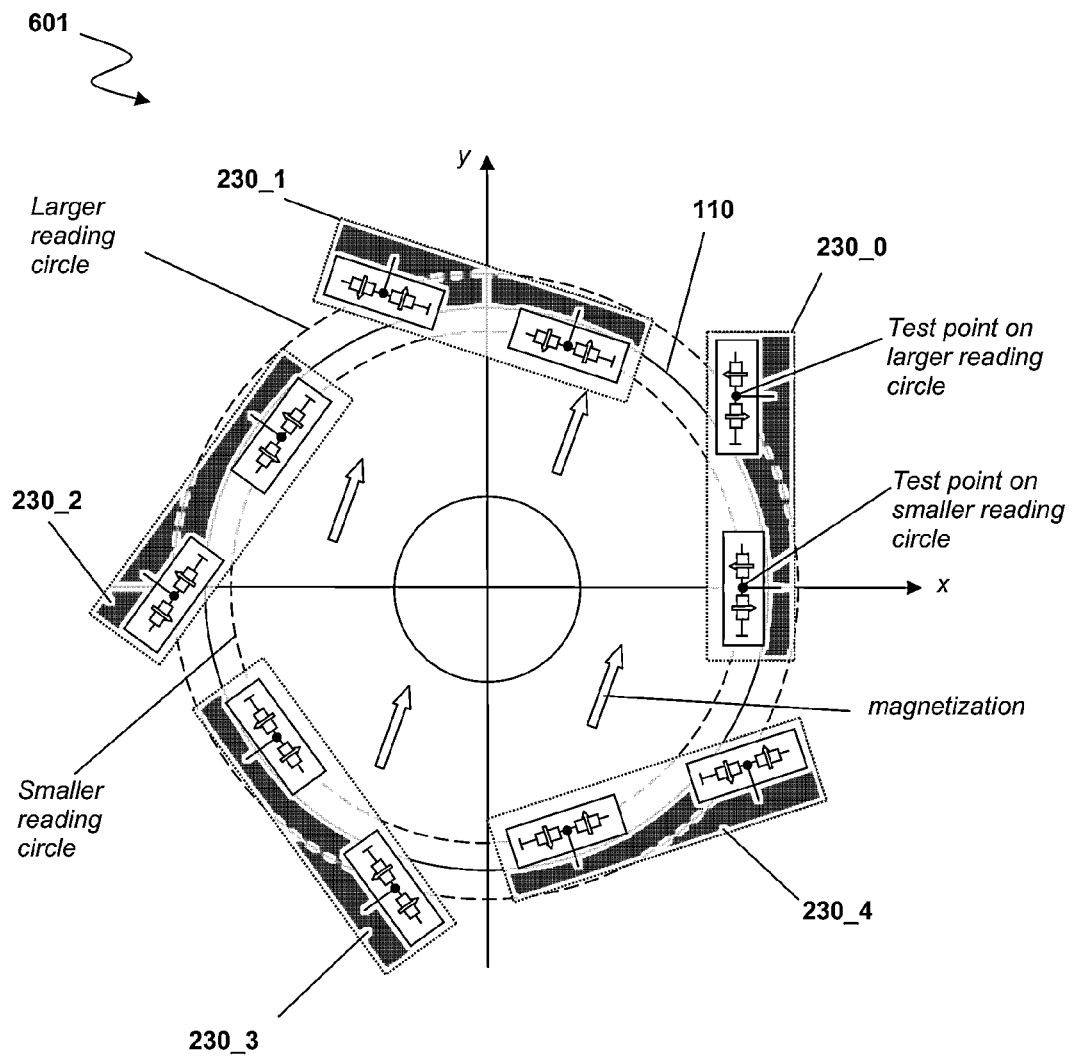
FIG. 6B is a schematic plan view of a sensor system according to an embodiment.

This is shown in FIG. 6B for one embodiment, in which the direction between both test points on a single die 230 is tilted such that it is tangential to the smaller reading circle. An exact tangential alignment is not necessary, and in fact a straight line between both test points on a die can have an arbitrary angle with respect to the tangential direction as well. In system 601, the signals $\tilde{S}_1(\psi^{(m)})$ and $\tilde{S}_2(\psi^{(m)})$ for m=0, 1, …, N−1, derived from half-bridges on first and second reading circle, are sampled. System 601 then determines $$\sigma_{1,n} = \sum_{m=0}^{N-1} \tilde{S}_1(\psi^{(m)}) \exp(2\pi jmn/N)$$

and $$\sigma_{2,n} = \sum_{m=0}^{N-1} \tilde{S}_2(\psi^{(m)}) \exp(2\pi jmn/N)$$

for n=0, 1, …, N−1 with the imaginary unit $j=\sqrt{-1}$. The fundamental frequencies $\sigma_{1,1}$ and $\sigma_{2,1}$ (n=1) represents the dominant part of the field of magnet 110, whereas the mean (n=0) and the higher harmonics (n>1) are caused by non-idealities like background magnetic disturbance, eccentric mounting of magnet or sensors versus rotation axis, sensor errors, magnet errors (e.g. deviation from spatial sinusoidal fields) and others. Thus, system 601 determines the fundamental frequency, whereby the ratio of real and imaginary parts thereof gives the tangent of the estimated rotational position of magnet 110:

$\psi_{0,1}' = \mathrm{mod}\{\arctan 2\{Re\{\sigma_{1,1}\}, Im\{\sigma_{1,1}\}\}, 360°\}$ and
$\psi_{0,2}' = \mathrm{mod}\{\arctan 2\{Re\{\sigma_{2,1}\}, Im\{\sigma_{2,1}\}\}, 360°\}$ Then, system 601 can determine a pre-conditioned average of both angles according to:

If $\psi_{0,2}' < \psi_{0,1}'$, then add 360° to $\psi_{0,1}'$

Then, $\psi_0' = \mathrm{mod}\{(\psi_{0,1}' + \psi_{0,2}' - 180°)/2; 360°\}$

Characteristics which can vary, mentioned in other embodiments, also can apply to embodiments of system 601 (e.g., number of test points on each circle, relative diameters of the reading circles with respect to each other and magnet 110, etc.). For good suppression of background magnetic disturbances, the following expression $$\sum_{m=0}^{N-1}\sum_{n=0}^{N-1} \frac{\cos(2\pi m/N)\sin(2\pi n/N)\sin(2\pi(n-m)/N)}{\sqrt{\left(\hat{B}_R/\hat{B}_\psi\right)^2 \cos^2(2\pi m/N) + \sin^2(2\pi m/N)}}$$

$$\frac{1}{\hat{B}_R}\frac{\frac{\sin^2(2\pi n/N) - \left(\hat{B}_R/\hat{B}_\psi\right)^2 \cos^2(2\pi n/N)}{\left(\left(\hat{B}_R/\hat{B}_\psi\right)^2\cos^2(2\pi n/N) + \sin^2(2\pi n/N)\right)^{3/2}}}{\left(\sum_{m=0}^{N-1} \frac{\cos^2(2\pi m/N)}{\sqrt{\left(\hat{B}_R/\hat{B}_\psi\right)^2 \cos^2(2\pi m/N) + \sin^2(2\pi m/N)}}\right)^2}$$

can have equal magnitude and opposite signs on both reading circles.

In one example embodiment of system 601 in which N=7, $\hat{B}_{R,1}/\hat{B}_{\psi,1}=1.2$ (the index 1 denotes "on reading circle #1"), and $\hat{B}_{R,1}/\hat{B}_{R,2}=-0.7$ (the indices 1 and 2 denotes "on reading circle #1 and #2, respectively," regardless which is larger or smaller so long as consistency is maintained) if ratio $\hat{B}_{R,2}/\hat{B}_{\psi,2}=-0.413463$ is required on the second reading radius. For disturbances that are 10% of $|\hat{B}_{R,1}|$, the angle error is about 0.1°.

Figure 7A:
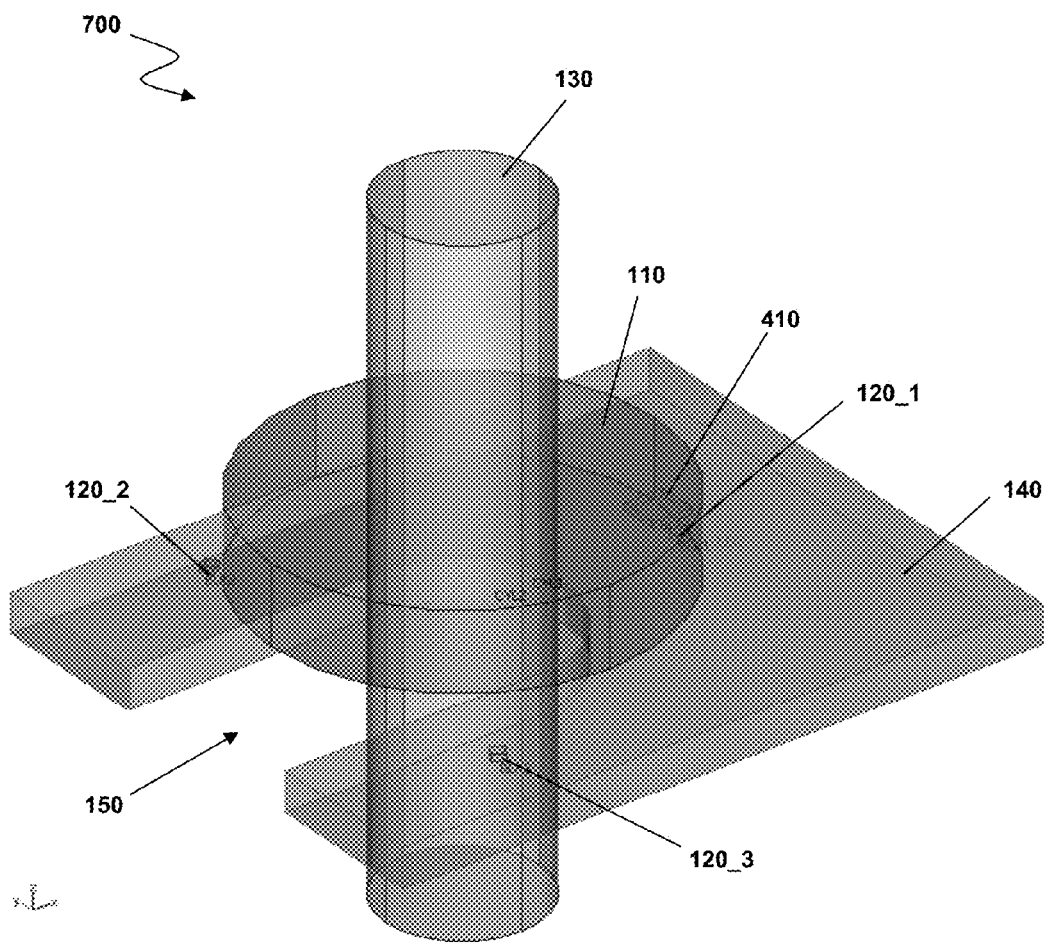
FIG. 7A is a perspective view of a sensor system according to an embodiment.
Figure 7B:
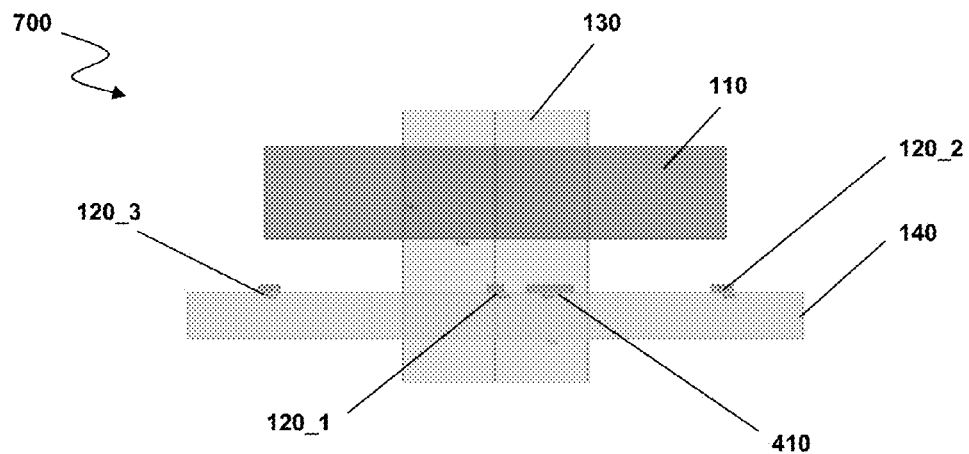
FIG. 7B is a side cross-sectional view of the sensor system of FIG. 7A.

Yet another embodiment is depicted in FIGS. 7A and 7B, with a ring magnet 110 coupled to a through-shaft 130 and arranged relative to a printed circuit or component board 140 through which shaft 130 passes. In FIGS. 7A and 7B, as herein generally, similar reference numerals are used to refer to similar elements or features, though similar elements or features in various embodiments may still vary from another in one or more ways as depicted or discussed. Three sensor devices 120_1, 120_2 and 120_3 are arranged on a reading circle (not depicted) concentric with shaft 130. Circuitry 410 is also depicted, is operatively coupled with sensor devices 120_1, 120_2 and 120_3, e.g., by copper traces on the top and/or bottom of board 140 in one embodiment, and can comprise control, evaluation, signal conditioning and/or other circuitry in order to receive and process signals from sensor devices 120_1, 120_2 and 120_3 and determine or obtain estimations of rotational positions or angles related to magnet 110 in embodiments.

Sensor devices 120_1, 120_2 and 120_3 can comprise small dies (e.g., die 230) arranged on board 140 in embodiments, such as on the order of about 0.5 mm by about 0.5 mm by about 0.2 mm in one example, though these dimensions can vary in other embodiments. As depicted, an edge of each sensor device 120_1, 120_2 and 120_3 is generally aligned with the radial and azimuthal direction of shaft 130, and equidistantly spaced from shaft 130, on board 140 which is in a plane perpendicular to shaft 130. In one embodiment, a diameter of the reading circle on which sensor devices 120_1, 120_2 and 120_3 are arranged has a diameter of about 17.4 mm.

Magnet 110 is homogeneously magnetized in a diametrical direction. In one embodiment, magnet 110 has an inner diameter of about 6 mm (which is, e.g., substantially equal to a diameter of shaft 130), an outer diameter of about 15 mm, and thickness or depth of about 3 mm. Though its material can vary, it can comprise a hard ferrite with a remanence of about 220 mT in one embodiment.

Board 140 comprises a central bore or aperture 150 to accommodate shaft 130 along with some reasonable clearance to permit shaft 130 to freely rotate. Aperture 150 comprises a portion extending inwardly in an embodiment to enable board to be mounted with respect to shaft 130 without having to be pulled over an end of shaft 130. In general, a width of aperture 150 is greater than a diameter of shaft 130 but less than a distance between, e.g., sensor devices 120_2 and 120_3. The width need not be the same at all portions of aperture 150 in embodiments, and other shapes and arrangements can be implemented in other embodiments.

The various components depicted (e.g., sensor devices 120_1, 120_2 and 120_3, circuitry 410) as well as others of or in system 700 can be conventionally mounted to board 140 (i.e., with their back or rear sides coupled to board 140), and electrical connections can be made between the elements and traces on board 140 by wire bonding, such as nail bonding or wedge bonding, and one or more of the bond wires and dies can be covered with mold compound or some other material or structure for protection. In other bonds, the dies (e.g., of sensor devices 120_1, 120_2 and 120_3, circuitry 410) can be flip-chip mounted with their front sides opposite board 140, with electrical connections then made via solder or other bumps, balls or underfill between the front side of each die and board 140. The dies again then may be covered by a protective mold compound or other material or structure.

In embodiments, each sensor device 120_1, 120_2, 120_3 comprises at least one half-bridge circuit, such as any of those depicted in and discussed with reference to FIGS. 4A, 4C, 5A, 5B and/or 6A or some other arrangement or configuration. The wiring and traces for coupling sensor devices 120_1, 120_2, 120_3, circuitry 410 and board 410, among other elements, can depend upon the particular embodiment implemented. For example, if sensor devices 120_1, 120_2, 120_3 comprise half-bridges similar to those of FIG. 4A, which is a simpler arrangement than others possible, each sensor device 120_1, 120_2, 120_3 typically will need three wires: two supply terminals and one signal terminal. Other half-bridge configurations can need additional couplings, such as four wires per sensor device 120_1, 120_2, 120_3 for FIGS. 5A, 5B and/or 6A or others (i.e., two signal terminals and two supply terminals). In embodiments, all of the wires are arranged on the same side of board 140 as the sensor dies. In one embodiment, sensor device 120_1 and/or circuitry 410 can comprise a single die or package, such that wiring can be reduced given fewer elements in the system.

In another embodiment, the die of sensor device 120_1 and circuitry 410 can be stacked, with one or the other flip-chip mounted on the other. In general, virtually any configuration is possible, though in any care should be taken to maintain consistent positions of sensor devices 120_1, 120_2, 120_3 (e.g., the same z-positions). As previously mentioned, it is generally advantageous for sensor devices 120_1, 120_2, 120_3 to be identical, thus in one embodiment their dies are singulated from the same wafer to maintain consistent thickness, manufacturing tolerances and other factors which, if varied from one sensor to another, could introduce inconsistencies, irregularities or errors into system 700.

Another consideration can be the length of wires to couple sensor devices 120 and circuitry 410 in this and other embodiments. Longer wires can be vulnerable to disturbances such as thermo-EMF, thermal and other noise, and/or electromagnetic interference, particularly if signals are low, e.g., on the order of less than milli-Volts or micro-Amps. Thus, in embodiments the sensor elements can be selected to compensate for or avoid this and output sufficiently strong signals, or signal conditioning circuitry can be added. Thus, in embodiments TMR sensor devices are used, as they can provide large signal swings (e.g., about 50% of their supply voltage). The size of each TMR sensor device die can be minimized to reduce costs, e.g., on the order of about 250 micrometers laterally, which can still accommodate a plurality of half-bridges on the die. The material of the die can also be selected to reduce costs; for example, glass or some other suitable material can be used in embodiments. Other characteristics and configurations related to the type of sensor element to be used, demands of a particular application or some other factor can be selected or customized in embodiments, as appreciated by those skilled in the art.

In still another embodiment, board 140 can be flipped or reversed such that sensor devices 120_1, 120_2, 120_3 and circuitry 410 are protected from magnet 110, which moves. In such an embodiment, an additional intermediate board can be added to system 700; while this can increase the distance between sensor devices 120_1, 120_2, 120_3 and magnet 110, it can enhance reliability, protecting sensor devices 120_1, 120_2, 120_3 and circuitry 410 from any malfunction which could cause magnet 110 to strike or otherwise collide with board 140 and elements thereon.

Figure 7C:
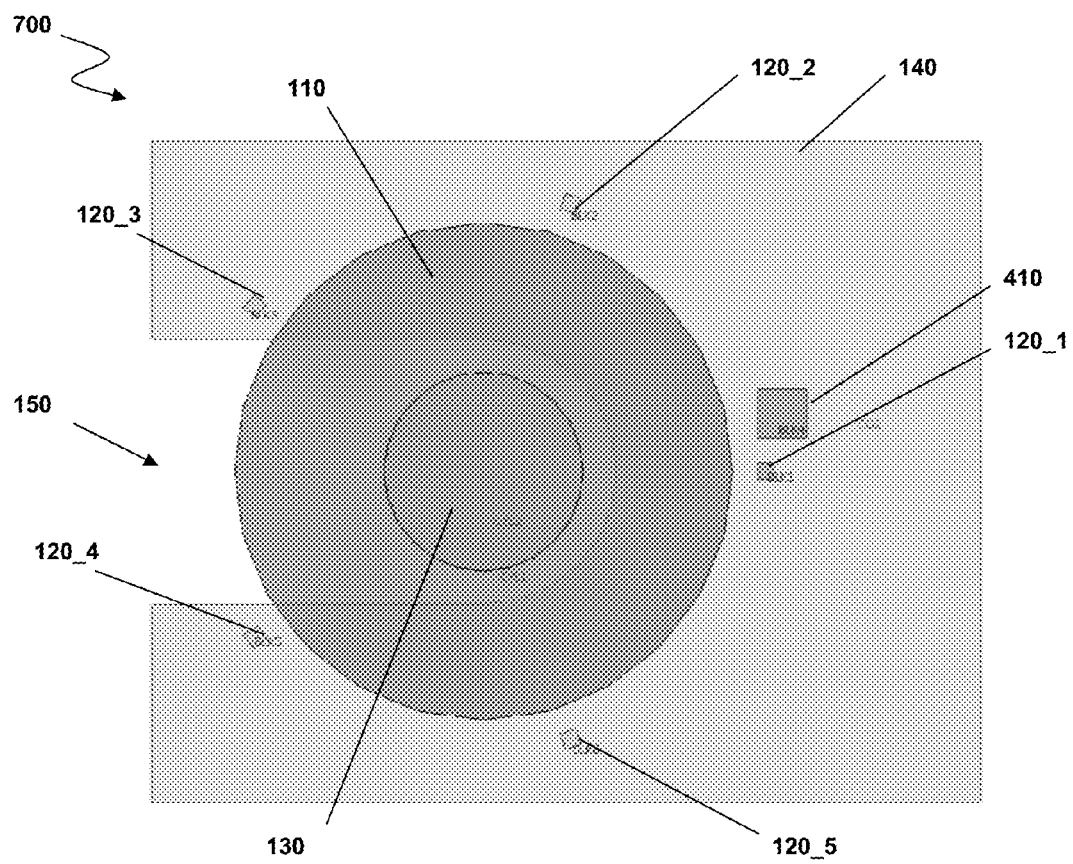
FIG. 7C is a plan view of a sensor system according to an embodiment.

The number of sensors can vary in embodiments of system 700. Referring to FIG. 7C, an embodiment of system 701 comprises five sensor devices 120_1, 120_2, 120_3, 120_4 and 120_5. The size or other characteristics of aperture 150 may need to be adjusted in embodiments having more sensors in order for the sensors to be arranged relative thereto and the other sensors. For example, in FIG. 7C a minimum distance between sensor device 120_3 or 120_4 and an edge of aperture 150 is about 0.65 mm, while aperture 150 is itself about 8 mm wide. In some embodiments in which size and spacing are more critical because of one factor or another, the size of the sensors may be adjusted. For example, they can be made smaller, e.g., about 0.25 mm by about 0.25 mm by about 0.2 mm in one example.

Embodiments like those of FIGS. 7A-7C, comprising three or five sensor devices 120, can be advantageous with respect to be efficient in terms of low angle errors and robustness against background magnetic fields and disturbances while having minimal numbers of sensors, which can reduce costs, and being compatible with board and aperture geometries for ease of assembly.

Figure 8A:
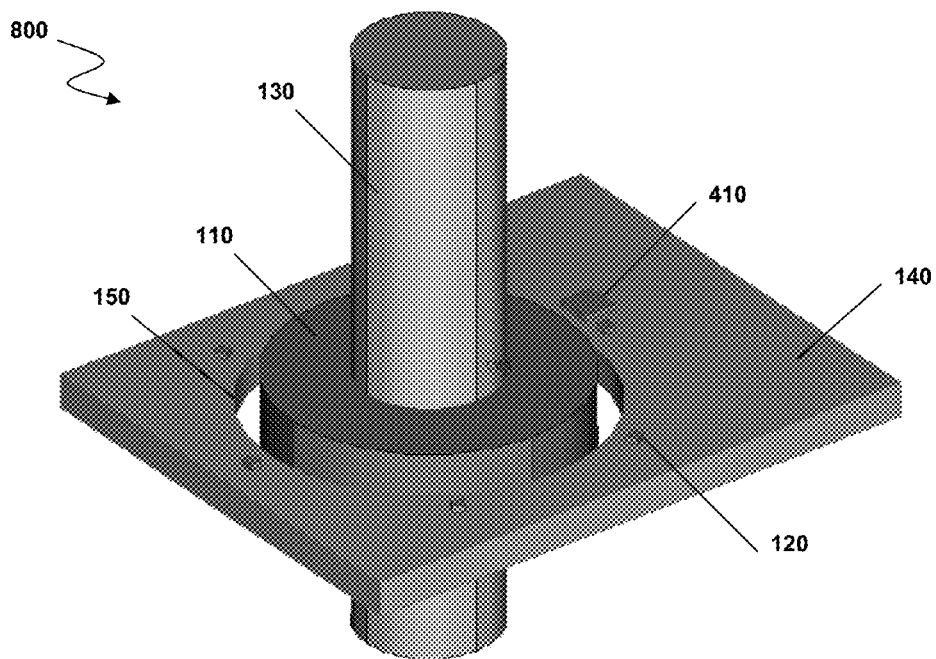
FIG. 8A is a perspective view of a sensor system according to an embodiment.
Figure 8B:
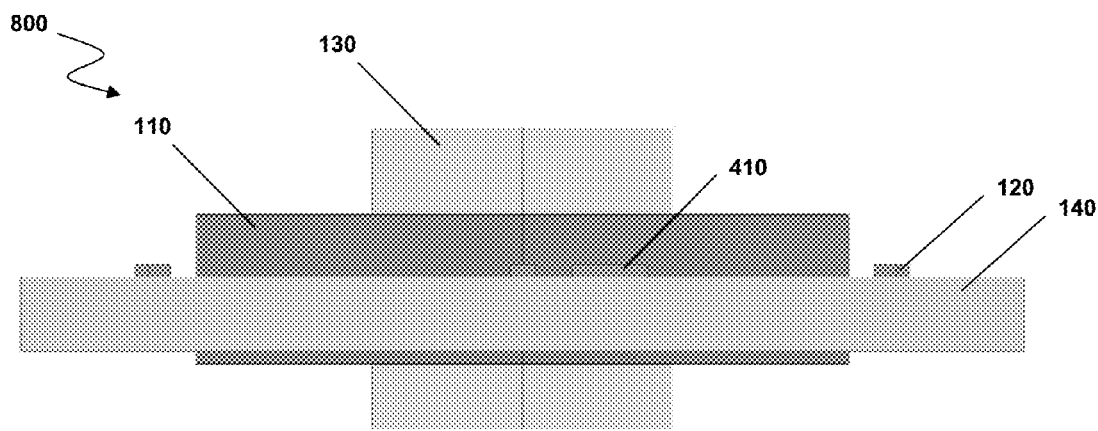
FIG. 8B is a side view of the sensor system of FIG. 8A.

Assembly can be more complicated in an embodiment such as the one depicted in FIG. 8 in which sensor devices 120 (N=6 in system 800) are arranged relative to the midplane of magnet 110, rather than above or below it. In such an embodiment, it may not be possible for aperture to be made sufficiently large to enable magnet 110, or at least shaft 130, to be passed therethrough while maintaining sufficient space and area on board 140 for the various system components to be arranged. Thus, in embodiments like those of FIG. 8 board 140 can be mounted relative to shaft 130 by passing over an end of shaft 130. In such an embodiment, aperture 150 can comprise a simple hole in board 140 sufficient to accommodate board 140 and magnet 110 without extending to a side of board 140.

Figure 9A:
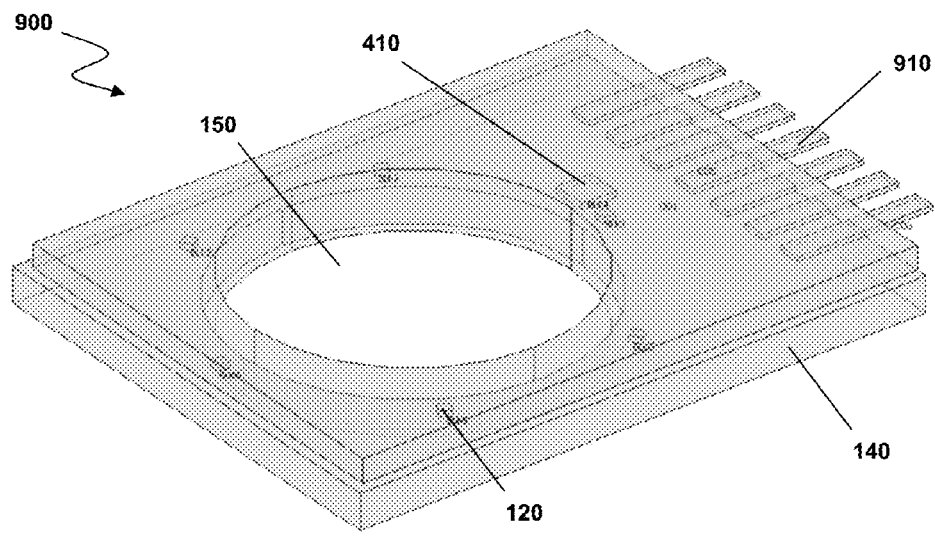
FIG. 9A is a perspective view of a sensor system package according to an embodiment.
Figure 9B:
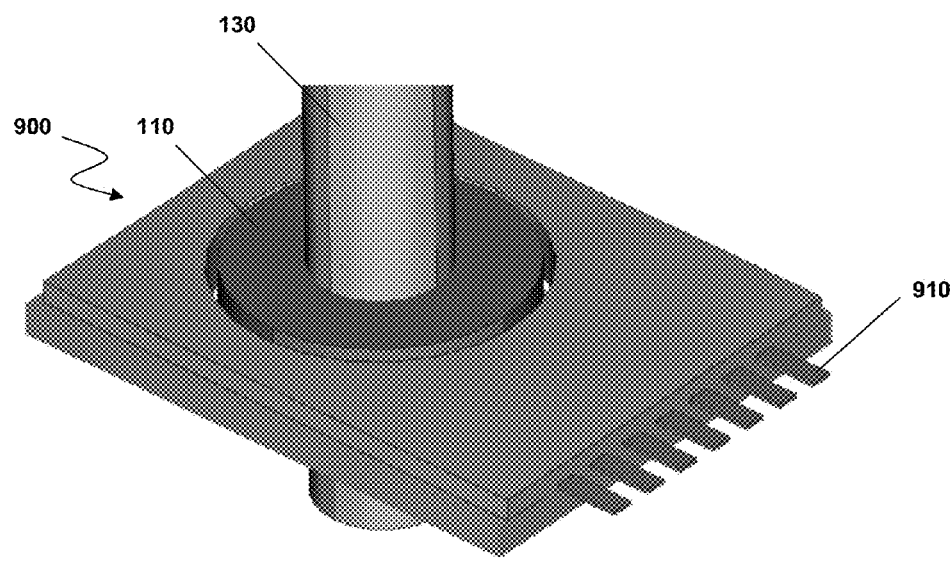
FIG. 9B is a perspective view of a sensor system package according to an embodiment.

In still another embodiment, a single sensor "package" 900 as depicted in FIGS. 9A and 9B can be provided, in which all desired sensor elements and wiring to the board are provided, which can replace ordinary leadframes for plastic-encapsulated packages. Package 900 can comprise board 140 with suitable interconnect traces, sensors 120 and circuitry 410, and terminals 910, which can vary from the example shown in FIG. 9. Mold compound can cover the various components in package 900, and aperture 150 can be provided to accommodate magnet 110 and 130 (FIG. 9B). Package 900 can provide more accurate and better placement of sensors 120 with respect to one another when carried out by, e.g., the semiconductor manufacturer as opposed to the module manufacturer. Package 900 can be considered a PCB package in that it comprises several dies mounted on a board which holds the dies in place and provides the electrical couplings for operation. The particular design of package 900 (e.g., with aperture 150) can be customized for a particular magnet, shaft configuration, application or other factor. For example, package 900 can comprise an aperture the same as or similar to that depicted in FIG. 7A, which could be less expensive if it results in an overall smaller size of package 900, which otherwise could be quite large in order to accommodate the magnet and shaft.

Figure 10:
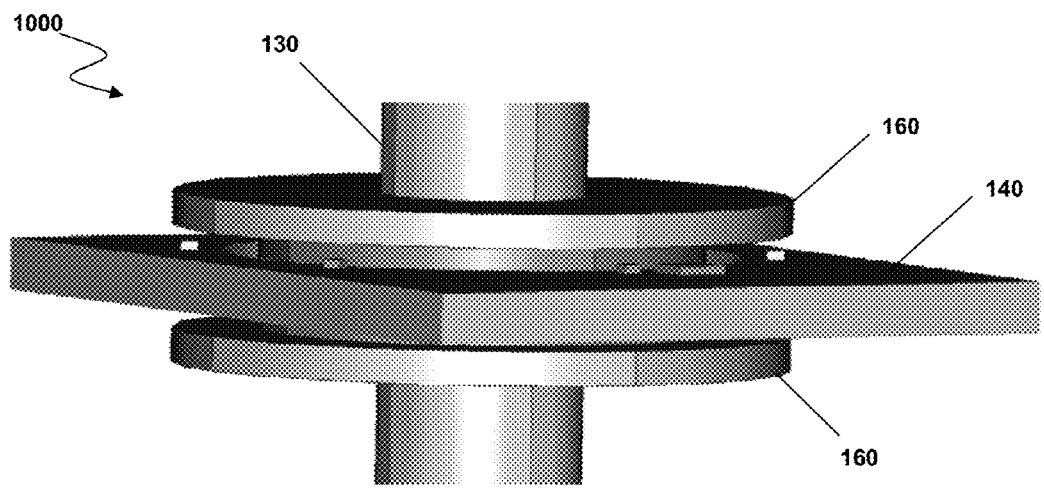
FIG. 10 is a perspective view of a sensor system according to an embodiment.

The configuration of magnet 110 also can be changed in this or another embodiment. For example, in system 1000 of FIG. 10 magnet 110 comprises a plates 160 arranged on the top and bottom of magnet 110. Plates 160 have a larger diameter than magnet 110 in the embodiment of FIG. 10 but can be the same size as or smaller in other embodiments and can comprise a ferrous or non-ferrous material in embodiments. In ferrous embodiments, plates 160 can function as magnetic "mirrors," increasing the magnetic field generated by magnet 110. Plates 160 also can simply protect the magnet dies or other components from the environment. Shaft 130 can also be ferrous or non-ferrous, regardless of plates 160.

Regardless of sensor system configuration, in embodiments and in operation, circuitry 410 or other circuitry coupled to the sensor system can compare the magnetic angles estimate by each sensor element. This can be done to, e.g., detect significant errors affecting one or more of the sensors (e.g., if the data communication was faulty due to EMC disturbances or broken wires or if a single sensor device was defective or if the magnet fell off the shaft or broke into pieces, among others). Thus, the circuitry can compute the "best guess" angle value according to the schemes outlined above and in a subsequent step compare all magnetic angles with this best guess. If the difference is larger than, e.g., 45° it may identify that the respective sensor device or the communication with this sensor units had an error. Then it can signal this error. It can also try to obtain a new best guess which discards the signals obtained by one or several sensor units. In embodiments, therefore, the sensor system can use the redundancy of the several sensor devices to improve the reliability of its total angle estimation. One which can be particularly robust comprises 2*N sensor devices. If the system finds, by comparison of the 2N angle readings, that one or more values are likely faulty, the system can determine a new conditioned average using the values of, e.g., every other sensor device, or otherwise discarding at least one reading. The accuracy of N angle readings is still relatively or sufficiently high such that degradation in performance is low. For example, in an N=6 system with sensor devices at integer multiples of 60 degrees, if sensor device N=3 differs significantly from all others, the system can use sensor devices N=2, 4 and 6 to form an N=3 system and still obtain an accurate angle reading.

If the sensor devices detect magnetic field components, they also can use an adaptive learning algorithm in embodiments. At start-up the system operates as discussed generally herein. It can estimate the rotational position of the magnet accordingly and thus it also knows when an angular stroke of 360° has been executed (e.g., by storing the minimum and maximum estimated angle and setting a flag when a 0°/360° or 360°/0° transition occurred). When a full 360° rotation of the magnet has been detected the system knows that both maxima and minima of both magnetic field components must have been detected. If these maxima and minima were stored the system can compute the k-factor (i.e., a ratio of amplitudes of radial and azimuthal magnetic field components) by (max(B1)−min(B1))/(max(B2)−min(B2)), wherein B1 and B2 denote the two magnetic field components. Then it can use this k-factor to improve the accuracy of further angle estimations. If such a learning algorithm is present the sensor units can also signal this to the controller. Then the controller can decide if some sensor units are powered down to save energy. In one embodiment the controller initiates an operating mode where the sensor units are working intermittently: a first group of sensor units works during a first period of time, and then a second group of sensor units works during a second period of time, and this can start again with the first group, etc.

In various embodiments, the system can use the angles between the projections of the magnetic fields onto the planes and the reference directions sampled on the locations on each sensor unit, but the sensor units do not necessarily need to provide these angles. The sensors can also provide both components of the in-plane magnetic field or they can encode the information in many different ways, e.g., min(abs(B1),abs(B2))/max(abs(B1),abs(B2)) (where 1 and 2 denote two different components). In embodiments, then, the sensor units can provide the raw data, but it can be either the sensor unit or control circuitry that derives the angle from the raw data. For example, the sensor unit can be a magneto-resistive device, such as, e.g., a strong-field GMR or TMR or an AMR. Such a device provides no magnetic field component instead it provides a signal that is proportional to the cosine or sine of an angle between a magnetic field projection onto the chip surface and a reference direction.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A magnetic field angle sensing system configured to determine a rotational position of a magnetic field source around a rotation axis, comprising:
   N sensor devices arranged in a circle concentric to the rotation axis, wherein N>1 and the sensor devices are spaced apart from one another by about (360/N) degrees along the circle, each sensor device comprising:
      a magnetic field sensing device having a sensitivity plane comprising at least one reference direction of the magnetic field sensing device, wherein the magnetic field sensing device is sensitive to a magnetic field component in the sensitivity plane and configured to provide a signal related to a (co)sine of an angle between the reference direction and the magnetic field in the sensitivity plane; and
      circuitry coupled to the N sensor devices and configured to provide a signal indicative of a rotational position of a magnetic field source around the rotation axis determined by combining the signals from the magnetic field sensing devices of the N sensor devices,
      wherein the circuitry is configured to pre-condition and average the signals as part of the combining, and the circuitry is configured to pre-condition the signals by combining integer multiples equivalent to 360 degrees with input data to result in at least one monotonously rising or falling sequence of values in a single clockwise or counter-clockwise direction of angular positions of respective ones of the N sensor devices.

2. The system of claim 1, wherein the magnetic field source comprises a permanent magnet with a Halbach magnetization.

3. The system of claim 1, wherein the N sensor devices are arranged on a single die.

4. The system of claim 1, wherein the magnetic field sensing device comprises a Hall-effect element or a magnetoresistive (MR) element.

5. The system of claim 4, wherein the magnetic field sensing device comprises a half-bridge circuit comprising two MR elements with different reference directions.

6. The system of claim 1, wherein the sensitivity planes of the magnetic field sensing devices of each of the N sensor devices are nominally parallel.

7. A magnetic field angle sensing system configured to determine a rotational position of a magnetic field source around a rotation axis, comprising:
   N sensor devices arranged in a circle concentric to the rotation axis, wherein N>1 and the sensor devices are spaced apart from one another by about (360/N) degrees along the circle, each sensor device comprising:
      a magnetic field sensing device having a sensitivity plane comprising at least one reference direction of the magnetic field sensing device, wherein the magnetic field sensing device is sensitive to a magnetic field component in the sensitivity plane and configured to provide a signal related to a (co)sine of an angle between the reference direction and the magnetic field in the sensitivity plane; and
      circuitry coupled to the N sensor devices and configured to provide a signal indicative of a rotational position of a magnetic field source around the rotation axis determined by combining the signals from the magnetic field sensing devices of the N sensor devices,
      wherein the circuitry is configured to pre-condition and average the signals as part of the combining, and the circuitry is configured to pre-condition the signals by interpreting the signals of the N sensor devices as coordinates of a complex pointer and rotating the complex pointer into a normalized rotational position that is the same for all N sensor devices.

8. The system of claim 1, wherein the circuitry is configured to apply a discrete Fourier transform to a set of N signals of the magnetic field sensing devices as part of the combining.

9. A method of determining a rotational position of a magnetic field source around a rotation axis, comprising:
   arranging N>1 sensor devices in a circle concentric to the rotation axis such that the sensor devices are spaced apart from one another by about (360/N) degrees along the circle;
   sensing, by a magnetic field sensing device of each of the N>1 sensor devices, a (co)sine of an angle between a reference direction of the magnetic field sensing device and the magnetic field in a sensitivity plane of the magnetic field sensing device induced by the magnetic field source, the sensitivity plane comprising at least one reference direction of the magnetic field sensing device;
   providing a signal related to the (co)sine of the angle between the reference direction and the magnetic field in the sensitivity plane;
   providing a signal indicative of a rotational position of the magnetic field source around the rotation axis by combining the signals from the magnetic field sensing devices of the N>1 sensor devices; and
   pre-conditioning and averaging the signals as part of the combining, wherein the pre-conditioning comprises combining integer multiples equivalent to 360 degrees with input data to identify at least one monotonously rising or falling sequence of values in a single clockwise or counter-clockwise direction of angular positions of respective ones of the N sensor devices.

10. The method of claim 9, further comprising providing the magnetic field source comprising a magnet with a Halbach magnetization.

11. The method of claim 9, further comprising providing the N>1 sensor devices on a single die.

12. The method of claim 9, wherein the magnetic field sensing device comprises a Hall-effect element or a magnetoresistive (MR) element.

13. The method of claim 12, further comprising arranging the magnetic field sensing device in a half-bridge circuit of two MR elements having different reference directions.

14. The method of claim 9, wherein the sensitivity planes of the magnetic field sensing devices of each of the N>1 sensor devices are nominally parallel.

15. A method of determining a rotational position of a magnetic field source around a rotation axis, comprising:
arranging N>1 sensor devices in a circle concentric to the rotation axis such that the sensor devices are spaced apart from one another by about (360/N) degrees along the circle;
sensing, by a magnetic field sensing device of each of the N>1 sensor devices, a (co)sine of an angle between a reference direction of the magnetic field sensing device and the magnetic field in a sensitivity plane of the magnetic field sensing device induced by the magnetic field source, the sensitivity plane comprising at least one reference direction of the magnetic field sensing device;
providing a signal related to the (co)sine of the angle between the reference direction and the magnetic field in the sensitivity plane;
providing a signal indicative of a rotational position of the magnetic field source around the rotation axis by combining the signals from the magnetic field sensing devices of the N>1 sensor devices; and
pre-conditioning and averaging the signals as part of the combining, wherein the pre-conditioning comprises interpreting the signals of the N sensor devices as coordinates of a complex pointer and rotating the complex pointer into a normalized rotational position that is the same for all N sensor devices.

16. The system of claim 1, further comprising applying a discrete Fourier transform to a set of N signals of the magnetic field sensing devices as part of the combining.

* * * * *